United States Patent
Hetzel et al.

(10) Patent No.: US 10,452,452 B2
(45) Date of Patent: Oct. 22, 2019

(54) RECONFIGURABLE PROCESSOR FABRIC IMPLEMENTATION USING SATISFIABILITY ANALYSIS

(71) Applicant: Wave Computing, Inc., Campbell, CA (US)

(72) Inventors: Asmus Hetzel, Berlin (DE); Samit Chaudhuri, Cupertino, CA (US)

(73) Assignee: Wave Computing, Inc., Campbell, CA (US)

( * ) Notice: Subject to any disclaimer, the term of this patent is extended or adjusted under 35 U.S.C. 154(b) by 12 days.

(21) Appl. No.: 15/953,896

(22) Filed: Apr. 16, 2018

(65) Prior Publication Data
US 2018/0300181 A1    Oct. 18, 2018

Related U.S. Application Data

(60) Provisional application No. 62/486,204, filed on Apr. 17, 2017, provisional application No. 62/650,758, filed on Mar. 30, 2018.

(51) Int. Cl.
*G06F 9/50* (2006.01)
*G06F 15/78* (2006.01)

(52) U.S. Cl.
CPC .................................. *G06F 9/5055* (2013.01)

(58) Field of Classification Search
CPC .................................................. G06F 9/5055
USPC ........................................................ 716/117
See application file for complete search history.

(56) References Cited

U.S. PATENT DOCUMENTS

| | | |
|---|---|---|
| 8,788,792 B2 | 7/2014 | Yates, Jr. et al. |
| 8,943,482 B2 | 1/2015 | Andrade et al. |
| 8,966,457 B2 | 2/2015 | Ebcioglu et al. |
| 8,984,464 B1 * | 3/2015 | Mihal ............... G06F 17/5072 716/118 |
| 2014/0347375 A1 | 11/2014 | Stenson et al. |

(Continued)

FOREIGN PATENT DOCUMENTS

WO    WO 2010/058981 B1    1/2016

OTHER PUBLICATIONS

Safarpour et al., "Efficient SAT-based Boolean Matching for FPGA Technology Mapping", Jul. 2006, ACM, pp. 466-471.*

(Continued)

*Primary Examiner* — Suresh Memula
(74) *Attorney, Agent, or Firm* — Adams Intellex, PLC

(57) ABSTRACT

Disclosed techniques utilize a satisfiability solver for allocation and/or configuration of resources in a reconfigurable fabric of processing elements. A dataflow graph is an input provided to a toolchain that includes a satisfiability solver. The satisfiability solver operates on subsets of interconnected nodes within a dataflow graph to derive a solution. The solution is trimmed by removing artifacts and unnecessary parts. The solutions of subsets are then used as an input to additional subsets of nodes within the dataflow graph in an iterative process to derive a complete solution. The satisfiability solver technique uses adaptive windowing in both the time dimension and the spatial dimensions of the dataflow graph. Processing elements and routing elements within the reconfigurable fabric are configured based on the complete solution. Data computation is performed based on the dataflow graph using the processing elements and the routing resources.

29 Claims, 14 Drawing Sheets

(56) References Cited

U.S. PATENT DOCUMENTS

| | | | |
|---|---|---|---|
| 2015/0379403 A1* | 12/2015 | Ezick | G06N 5/022 706/57 |
| 2016/0179484 A1 | 6/2016 | Yan et al. | |
| 2019/0042941 A1* | 2/2019 | Esbensen | G06N 3/08 |
| 2019/0057060 A1* | 2/2019 | Nicol | G06F 15/80 |
| 2019/0138373 A1* | 5/2019 | Nicol | G06F 9/545 |

OTHER PUBLICATIONS

Wood et al., "FPGA Routing and Routability Estimation via Boolean Satisfiability", Jun. 1998, IEEE, vol. 6, No. 2, pp. 222-231.*
Mihal, A., & Teig, S. (Jul. 2013). A constraint satisfaction approach for programmable logic detailed placement. In International Conference on Theory and Applications of Satisfiability Testing (pp. 208-223). Springer, Berlin, Heidelberg.

* cited by examiner

RECONFIGURABLE PROCESSOR FABRIC IMPLEMENTATION USING SATISFIABILITY ANALYSIS

RELATED APPLICATIONS

This application claims the benefit of U.S. provisional patent applications "Reconfigurable Processor Fabric Implementation Using Satisfiability Analysis" Ser. No. 62/486,204, filed Apr. 17, 2017, and "Data Flow Graph Computation for Machine Learning" Ser. No. 62/650,758, filed Mar. 30, 2018.

Each of the foregoing applications is hereby incorporated by reference in its entirety.

FIELD OF ART

This application relates generally to logic circuitry and more particularly to reconfigurable processor fabric implementation using satisfiability analysis.

BACKGROUND

High-performance computing is prevalent nowadays, being utilized in a wide variety of applications such as data processing, image processing, multimedia encoding and decoding, and data communication. In order to accomplish the desired goals, there must be sufficient computing power. In addition to computing power, flexibility is also important for adapting to ever-changing business and technical situations. While software continues to evolve and become more capable, there are still particular time-sensitive tasks that cannot be practically performed in software within their application time constraints. As such, these tasks require hardware to be employed.

Additionally, other factors such as price and supply chain become important in many applications. In general, development using reconfigurable hardware can be considerably more cost effective than development of a dedicated Application Specific Integrated Circuit (ASIC). Another benefit of reconfigurable hardware pertains to supply chains. A product that requires multiple integrated circuits may be able to use multiple instances of the same reconfigurable hardware, rather than several different ASICs from different manufacturers. Thus, in some instances, a Bill of Materials (BOM) for a product can be simplified by using reconfigurable hardware.

In some architectures, multiple cores can work together to perform a particular task. In these cases, the cores communicate with each other, exchange data, and combine data to produce intermediate and/or final outputs. Each core can have a variety of registers to support program execution and storage of intermediate data. Additionally, registers such as stack pointers, return addresses, and exception data can also be present to enable execution of complex routines and to support debugging of computer programs running on the multiple cores. Furthermore, arithmetic units can provide mathematical functionality, such as addition, subtraction, multiplication, and division.

Another advantage of reconfigurable hardware is that in many processing applications, reconfigurable devices have proven extremely efficient for certain types of processing tasks. The main reason why cost and performance advantages of reconfigurable devices exist in certain circumstances is that reconfigurable logic enables program parallelism, allowing multiple simultaneous computation operations to occur for the same program. Meanwhile, conventional processors are often limited by instruction bandwidth and execution restrictions. Often, the high-density properties of reconfigurable devices come at the expense of the high-diversity property that is inherent in microprocessors. Microprocessors have evolved to a highly-optimized configuration that can provide cost/performance advantages over reconfigurable arrays for certain tasks with high functional diversity. However, there are many tasks for which a conventional microprocessor may not be the best design choice. Other conventional computing techniques involve the use of application specific integrated circuits (ASICs) that are designed from the ground up with a specific application or implementation in mind. These ASICs can accomplish high performance tasks, but at the cost of extremely inflexible hardware design.

The emergence of reconfigurable computing has created a capability for both flexibility and performance of computer systems. Reconfigurable computing combines the high speed of application-specific integrated circuits with the flexibility of programmable processors. Reconfigurable computing thus provides much-needed functionality, speed, performance, flexibility, ease of implementation, and power consumption, to name just a few benefits, to enable the technology in many current and upcoming fields to operate in a cost-effective, flexible, and extendable manner of operation.

SUMMARY

Scheduling, placement, and routing are critical components in the configuration of a reconfigurable fabric. Scheduling involves deciding the function of each processing element within a reconfigurable fabric for any given moment in time. Placement involves choosing which processing element within a reconfigurable fabric performs the scheduled task. Routing involves transmitting data among processing elements within a reconfigurable fabric. Sometimes, the term routing, in this context, can refer to the higher-level process of scheduling, placement, and routing, thus providing one term to describe the entire process of determining how to configure a reconfigurable fabric to perform a desired task. Of course, scheduling, placement, and routing are all tightly related, and a small change to any one of the scheduling, placement, or routing configurations can have a huge impact on the overall configuration solution.

For example, data conflicts can abound due to one processor needing data before another processor completes its processing of that data. In addition, a processing element can be used as a processing element, a storage element, or a switching element. For example, one or more processing elements placed in the middle of a reconfigurable fabric may be so needed to move data among neighbor processing elements, that they are scheduled as switching elements to fully concentrate on high-speed data transfers and not perform significant processing of that data. Also, in many cases, interconnection delays can be greater than the logic processing times of the processing elements within the reconfigurable fabric. Therefore, an efficient resource allocation and/or configuration algorithm attempts to reduce the register usage and instruction usage within the processing elements to improve the performance of the reconfigurable fabric. Disclosed embodiments utilize a satisfiability solver to accomplish these optimization goals and to provide a configuration solution for the reconfigurable fabric.

Furthermore, the scheduling, placement, and routing of resources within a reconfigurable fabric is completely different from FPGA routing. In FPGA routing, a fixed set of resources is connected during programming time, that is, before operation can start, to set up an FPGA device for a certain functionality. In addition, FPGA internal memory is always used as internal memory, FPGA I/O cells are always used as input/output channels, and FPGA internal cells are always use for their programmed functionality during runtime. For example, in an FPGA, an internal cell performing a logic operation can never be used to send data to a neighboring device. Likewise, in an FPGA, a logic cell used for a certain logic function, say, an XOR function, can never be then used as an AND function during runtime; only when the device is completely stopped and reprogrammed can this take place. By comparison, disclosed techniques for routing a reconfigurable fabric enable each element of a reconfigurable fabric to perform different functions during run time. A processing element can be programmed during load time, for example, to process data in a certain manner, as well as to transfer data to a number of neighboring processing elements—which can change during run time. Therefore, the disclosed scheduling, placement, and routing (which together can be generically called routing) for reconfigurable fabrics cannot be compared to routing in an FPGA environment, except that the same term is employed, but with a completely different meaning.

Disclosed embodiments provide a computer-implemented method for resource allocation comprising: configuring a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints, and wherein the satisfiability solver technique includes adaptive windowing; configuring routing resources within the reconfigurable fabric based on the satisfiability solver technique; and performing data computation based on the dataflow graph using the first plurality of processing elements and the routing resources. In embodiments, the satisfiability solver technique includes scaling with iterative packing. In embodiments, the scaling includes partitioning execution time into overlapping time windows. In yet other embodiments, the satisfiability solver technique includes bounding time in an adaptive window to solve an optimization sub-problem. In still other embodiments, the routing resources comprise a second plurality of processing elements.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
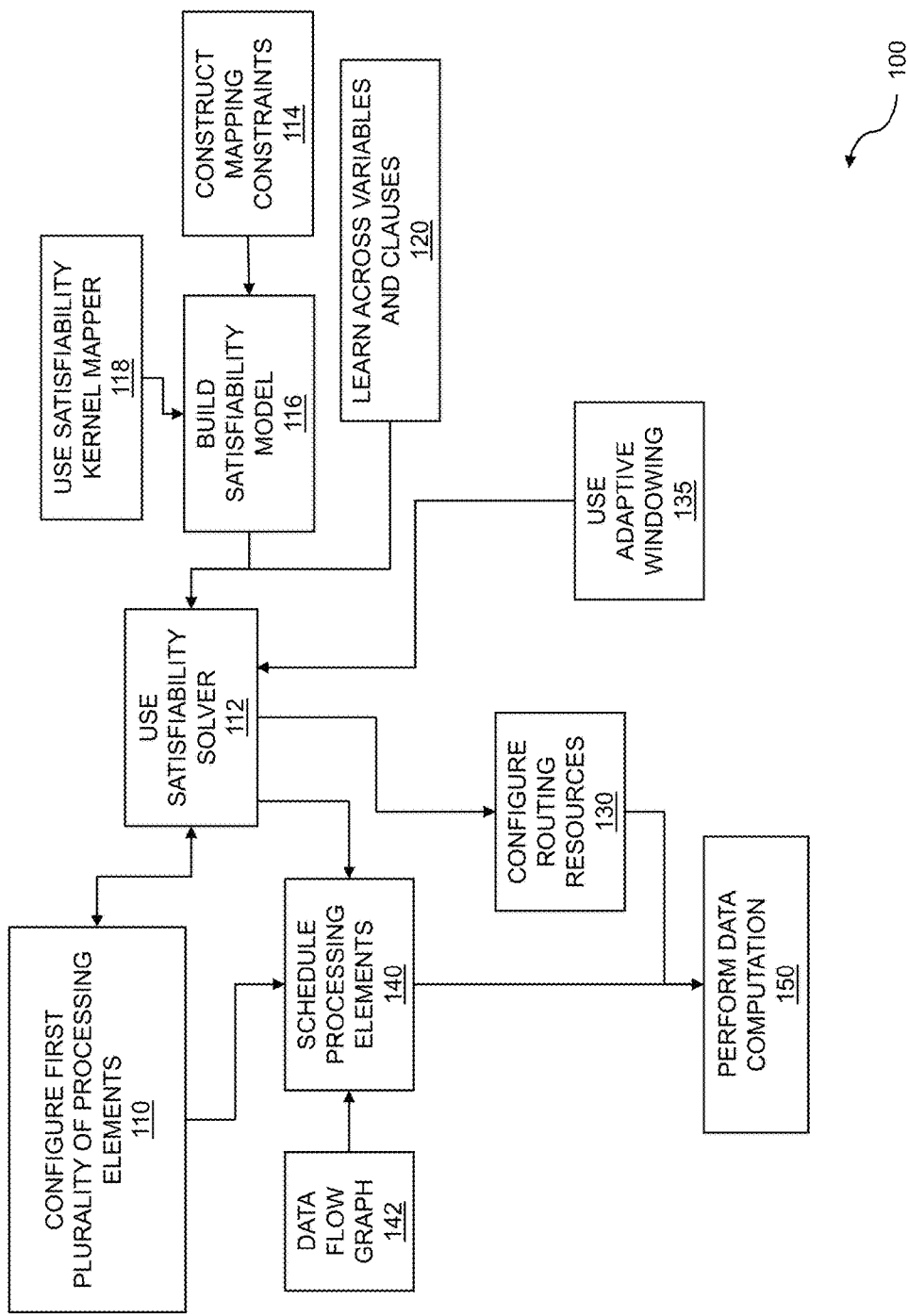
FIG. 1 is a flow diagram for reconfigurable processor fabric implementation using satisfiability analysis.

An advantage of a reconfigurable fabric is that it can be used to accomplish a wide variety of tasks by changing the configuration. The reconfigurable fabric contains multiple processing elements which may be arranged in an X-Y grid pattern. Some processing elements may be used for computation, while others may be used for routing or switching. In disclosed embodiments, a satisfiability solver is used to produce a solution that configures resources for computation and/or routing. The satisfiability solver can be a Boolean satisfiability solver. In a switching fabric of practical size, there can be tens of thousands of processing elements. While a satisfiability solver can be used to derive allocations and/or configurations for the entire fabric, the amount of time required for such processing may exceed practical limits. Allocations can be viewed as requirements to properly set up the dataflow graph on the reconfigurable fabric, and configurations can be viewed as the settings, code, circular buffer contents, etc. that are used to implement the allocations. While both allocations and configurations refer to accomplishing the same end, the difference is in whether a high-level view (allocations) or a lower-level view (configurations) is a more helpful construct. In embodiments, the satisfiability solver is operated on a subset of the reconfigurable fabric using a set of mapping constraints. The subset of the reconfigurable fabric can include a physical region in an XY space, as well as a temporal dimension. Thus, in embodiments, the mapping constraints comprise a three-dimensional (3D) solution space comprising the x and y physical location of processing elements along with a z dimension, i.e., time.

In a reconfigurable fabric with multiple processing elements, data is routed to various processing elements, where computation is performed and new results are propagated downstream to other processing elements. This routing of data can be challenging in a reconfigurable fabric of sufficient size. In embodiments, the resources for computing and routing are expressed as a large set of Boolean equations. For a given task, with a description of the reconfigurable fabric, a region to be routed, and mapping constraints, it is possible to compute a Boolean equation that determines the configuration that enables the desired routing. It is therefore desirable to accurately determine whether a given configuration is or is not routable on a given reconfigurable fabric. By formulating the allocations, that is, the routing and resource allocations, as a Boolean satisfiability problem (SAT), the simultaneous detailed routing constraints can be efficiently solved using satisfiability solvers.

The satisfiability solvers are capable of traversing a large search space to identify conditions that satisfy a set of constraints corresponding to the Boolean equations representative of the computing and routing resources. Disclosed techniques employ optimizations that result in a significant reduction in search processing time without affecting the thoroughness of the search.

Disclosed techniques utilize a satisfiability solver for allocation and/or configuration of resources in a reconfigurable fabric of processing elements. A dataflow graph is an input provided to a toolchain that includes a satisfiability solver. The satisfiability solver operates on subsets of interconnected nodes within a dataflow graph to derive a solution. The solution is trimmed by removing artifacts and unnecessary parts. The solutions of subsets are then used as an input to additional subsets of nodes within the dataflow graph in an iterative process to derive a complete solution. The satisfiability solver technique uses adaptive windowing in both the time dimension and the spatial dimensions of the dataflow graph. Processing elements and routing elements within the reconfigurable fabric are configured based on the complete solution. Data computation is performed based on the dataflow graph using the processing elements and the routing resources.

FIG. 1 is a flow diagram for reconfigurable processor fabric implementation using satisfiability analysis. The flow 100 illustrates a computer-implemented method for resource allocation. The flow 100 includes configuring a first plurality of processing elements 110 from a reconfigurable fabric for computational calculations, based on a dataflow graph 142, wherein the configuring is performed using a satisfiability solver 112 technique comprising constructing a set of mapping constraints 114 and building a satisfiability model 116 of the mapping constraints. The flow 100 can include configuring routing resources 130 within the reconfigurable fabric based on the satisfiability solver technique. In embodiments, the building a satisfiability model includes using a satisfiability kernel mapper 118. In embodiments, the mapping constraints comprise instructions for implementing a function on a processing element from the first plurality of processing elements. In embodiments, configuring of routing resources facilitates data propagation.

Embodiments can include setting up a complete SAT-model of the entire design and solving/mapping it optimally in a single round of processing. Alternatively, some embodiments solve the mapping problem iteratively by processing it within overlapping sub-tic intervals and combining the partial solutions. Thus, the flow 100 includes using adaptive windowing 135. Furthermore, post-processing can be used to minimize the use of processing element registers and instructions.

The flow can include learning across variables and clauses 120. The satisfiability solver technique comprises a Boolean satisfiability problem solving technique. The satisfiability solver may use constraints that have been formulated and encoded into Boolean equations represented in Conjunctive Normal Form (CNF) clauses. In embodiments, the satisfiability solver technique comprises learning across variables and clauses. In some embodiments, the satisfiability model includes variables, clauses, and the conjunction of clauses.

The conjunction of connectivity/exclusivity constraints for all processing elements within the reconfigurable fabric forms the routing Boolean function, which in turn models the routing problem. The Boolean satisfiability solver takes as input the Boolean function and tries to satisfy the assignments or to prove that the given layout is not satisfiable. If the layout is satisfiable, the solution is an assignment of binary values 1 or 0 to the Boolean variables which are transformed into an assignment of actual routing resources (processing elements, routing elements, and/or switching elements) which then implements the actual processing/routing solution.

In embodiments, the first plurality of processing elements is controlled by a first plurality of circular buffers. A given computational circuit can include multiple circular buffers and multiple circuits or logical elements. The circuits can include computational elements, communication paths, storage, and other circuit elements. Each circular buffer can be loaded with a page of instructions which configures the digital circuit operated upon by the instructions in the circular buffer. When and if a digital circuit requires reconfiguration, a different page of instructions can be loaded into the circular buffer and can overwrite the previous page of instructions that was in the circular buffer. A given circular buffer and the circuit element which the circular buffer controls can operate independently from other circular buffers and their concomitant circuit elements. The circular buffers and circuit elements can operate in an asynchronous manner. That is, the circular buffers and circuit elements can be self-clocked, self-timed, etc., and can require no additional clock signal. Further, swapping out one page of instructions for another page of instructions does not require a retiming of the circuit elements. The circular buffers and circuit elements can operate as hum circuits, where a hum circuit is an asynchronous circuit which operates at its own resonant or "hum" frequency. In embodiments, each of the plurality of processing elements can be controlled by a unique circular buffer. In some embodiments, circular buffers are statically scheduled. In embodiments, the scheduling includes static scheduling. Thus, in some cases, the initial configuration of the circular buffers may be established at compile time. In embodiments, each processing element from the first plurality of processing elements has an associated unique circular buffer from the first plurality of circular buffers. The instructions for implementing a function on the processing element are loaded into a circular buffer associated with the processing element that controls the processing element. In embodiments, the instructions for implementing a function on the processing element are loaded into a circular buffer associated with the processing element that controls the processing element.

The flow 100 includes scheduling the first plurality of processing elements 140 based on the dataflow graph 142 and the satisfiability solver 112 technique. The dataflow graph can be an intermediate representation of a design. The dataflow graph may be processed as an input by an automated tool such as a compiler. The output of the compiler may include instructions for reconfiguring processing elements to perform as process agents. The reconfiguring can also include insertion of a FIFO between two processing elements of a plurality of processing elements.

The flow 100 includes building a satisfiability model 116, which includes using a satisfiability kernel mapper 118. In embodiments, the satisfiability kernel mapper 118 captures implications. The implications are binary operations that return a value in a Boolean algebra, based on Boolean equations. The kernel mapper includes an algorithm for simultaneous scheduling, placement, and routing of instructions. The flow 100 includes configuring of routing resources 130 based on propagations indicated by routing instructions. The kernel mapper is based on a formulation of the problem as a single Boolean satisfiability problem that is solved by a SAT-solver. There are various advantages of this approach as compared to approaches based on separate placement/routing stages. One such advantage is that SAT-based approaches can better manage problems that are binary in nature. The reconfigurable fabric allows many adjustments where a set of instructions can be grouped together very efficiently if one or few specific patterns are achieved. If the patterns are not achieved, the grouping of the instructions can cause latency issues with the computation compared to an optimal configuration.

Another advantage is that SAT-solvers have an inherent learning capability. It is not necessary to teach a satisfiability solver all such specific configurations or favorable patterns. The satisfiability solver process handles these issues automatically. Yet another advantage is that a SAT-based formulation allows encoding and efficient processing of constraints that are not handled as conveniently in other algorithms, such as, for example, complex contention rules. Such constraints can be added to the SAT-model and become automatically obeyed in the solution process without changing anything in the core SAT-solver. In contrast, putting them into a placement/routing flow may often require specific algorithmic adjustments or separate heuristics that ensure constraint satisfaction.

The flow 100 includes using adaptive windowing 135 as part of the satisfiability solving technique. Adaptive windowing is employed in all three dimensions of the satisfiability solving technique. Adaptive windowing is used spatially within the dataflow graph to window down to a smaller size when there are too many constraints within a certain set of nodes within the dataflow graph to allow a timely or cost-effective solution to the problem. In this sense, the adaptive windowing performs along the x- and y-dimensions of the solution space. In addition, adaptive windowing is used in the time dimension to provide overlapping time windows within the satisfiability solving technique. In this sense, the adaptive windowing performs along the z-dimension of the solution space. In embodiments, the satisfiability solver technique includes scaling with iterative packing. In embodiments, the scaling includes partitioning execution time into overlapping time windows. In embodiments, the satisfiability solver technique includes bounding time in an adaptive window to solve an optimization sub-problem.

The flow 100 includes building a satisfiability (SAT) model 116. The SAT model is sufficient to capture everything needed in a compilation process. In embodiments, the satisfiability model is restricted to a current known solution. The currently known solution is a solution that may be obtained after removal of artifacts, trimming, and removing unnecessary parts of the solution. The flow 100 can include performing data computation 150 based on the dataflow graph 142 using the first plurality of processing elements and the routing resources. Embodiments can include scheduling the first plurality of processing elements based on the dataflow graph and the satisfiability solver technique.

A template can be used and can model the instruction(s) that are represented by a node in the flow graph together with all input/output requirements and also all potential contention rules relative to other templates. Generally, a template includes a set of Boolean clauses on certain Boolean variables that capture essential resource allocations that consider a specific realization of node functionality. Such templates can be referred to as node templates. Any dataflow graph node N can have a multitude of templates associated with it that denote the different alternative implementations or code/fragments for the node. Likewise, routing templates can be employed and are discussed later. Different templates may represent different sub-tics to which the node functionality is compiled, or different processors where the implementation is executed, or even different elementary variants that the hardware offers, for example different variants of chaining multiple 8-bit adders to form a 32-bit adder. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
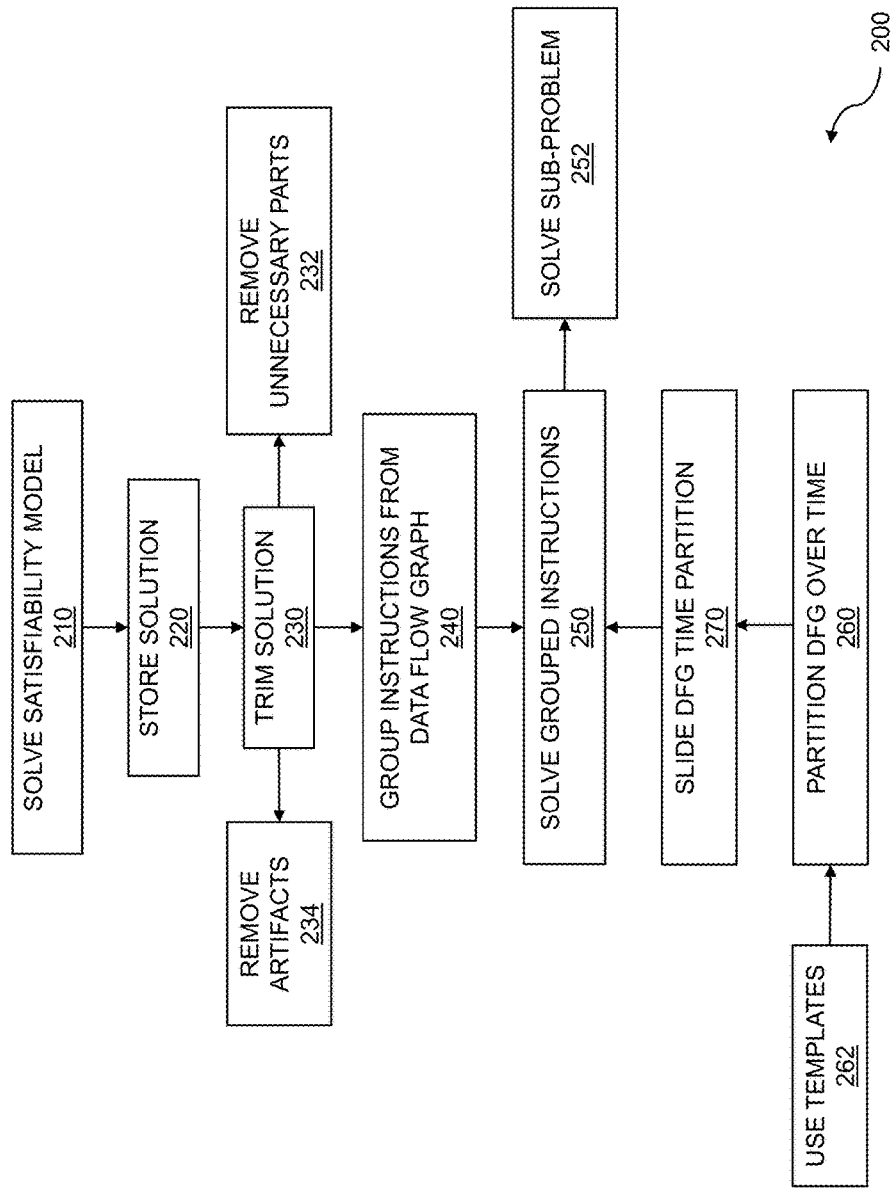
FIG. 2 is a flow diagram for Boolean satisfiability problem solving.

FIG. 2 is a flow diagram for Boolean satisfiability problem solving. The Boolean Satisfiability Problem (or SAT) is the problem of determining if a proposition statement is satisfiable. A propositional statement is satisfiable when it is possible to assign some true-false values for the variables in the statement such that the statement yields a Boolean True. Otherwise the statement is unsatisfiable. By using Boolean equations that represent the mapping constraints and resources of a reconfigurable fabric, a satisfiability solver can be used to identify a configuration for a reconfigurable fabric.

The flow 200 includes solving the satisfiability model 210. In embodiments, the satisfiability solver is search-based and uses a variety of intelligent techniques to explore new regions of the search space while looking for a satisfying assignment. In some embodiments, the satisfiability solver utilizes a Davis-Putnam-Logemann-Loveland (DPLL) process.

The flow 200 includes storing a solution of the satisfiability model 220. The stored satisfiability model may be stored in a non-volatile storage such as an optical hard disk, solid state hard disk, flash memory, or other suitable storage medium. The storing of the model can include, but is not limited to, storing topology information, initial settings of registers, initial instructions and values stored in circular buffers, placement of intermediate FIFOs, and/or other configuration information for the reconfigurable fabric.

The flow 200 includes trimming the solution 230, wherein the trimming includes removing unnecessary parts 232 from the solution. The unnecessary parts can include branches that did not resolve to a satisfiable solution. The satisfiability solver may utilize a backtracking algorithm to enhance performance over a brute-force approach. The satisfiability solver may order the search to maximize the amount of search space that can be trimmed.

In embodiments, the trimming further comprises removing artifacts 234. Furthermore, in embodiments, the removing artifacts employs a satisfiability model restricted to a current known solution. Artifacts are unnecessary usages of registers and instructions. They can appear as a consequence of the incremental mapping flow or generally when there is no objective that tries to minimize register usage or instructions. In embodiments, the satisfiability solver technique further comprises grouping instructions from the dataflow graph 240. The satisfiability solver technique includes solving the instructions which were grouped 250. In embodiments, the solving the instructions which were grouped 250 comprises solving a sub-problem 252. The solving can include identifying a solution to a Boolean equation that is representative of a portion of the physical and temporal dimensions of a reconfigurable fabric. The portion can be a sub-problem.

The flow 200 includes grouping or partitioning the dataflow graph (DFG) over time 260. This is necessary because it may be impossible to solve a complex DFG over the entire constraint time. A slice or partition of time can contain a much more manageable set of constraints to solve. The partition can be made over a time-related region or section of the DFG in which constraints can be solved in a time local fashion. The flow 200 includes using templates 262 to solve the constraints of the DFG. A template describes a method to generate specific content in specific resources at specific sub-tics out of other content. Templates can also be used to model only instructions, primary inputs, and/or primary outputs. The flow 200 includes sliding the DFG time partition 270 on a time basis earlier and later in the DFG flow. Local satisfiability is thereby optimized as the time partition is moved backwards and forwards. Solutions can be modified to avoid sub-optimizations within only a single time partition. The time slice can comprise a clock cycle of the reconfigurable fabric.

In further embodiments, the solving the instructions is across a set of sub-tics within the reconfigurable fabric. In embodiments, a time step can be referred to as a tic or a sub-tic. In essence, a time step is a period of time during which logic signals are maintained or are settled to specific values. In embodiments, the processing elements within the reconfigurable fabric are synchronized within a time step. In some embodiments, partitioning the dataflow graph into time partitions and solving the satisfiability model is accomplished for a time partition. In embodiments, the time partitions comprise regions of the dataflow graph. In some embodiments, solving includes moving the time partition forward and backward in time to optimize the solving of the satisfiability model across the backward in time partition, the time partition, and the forward in time partition. In embodiments, applying a template is performed, wherein the template describes local constraints for a node in the time partition of the dataflow graph. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
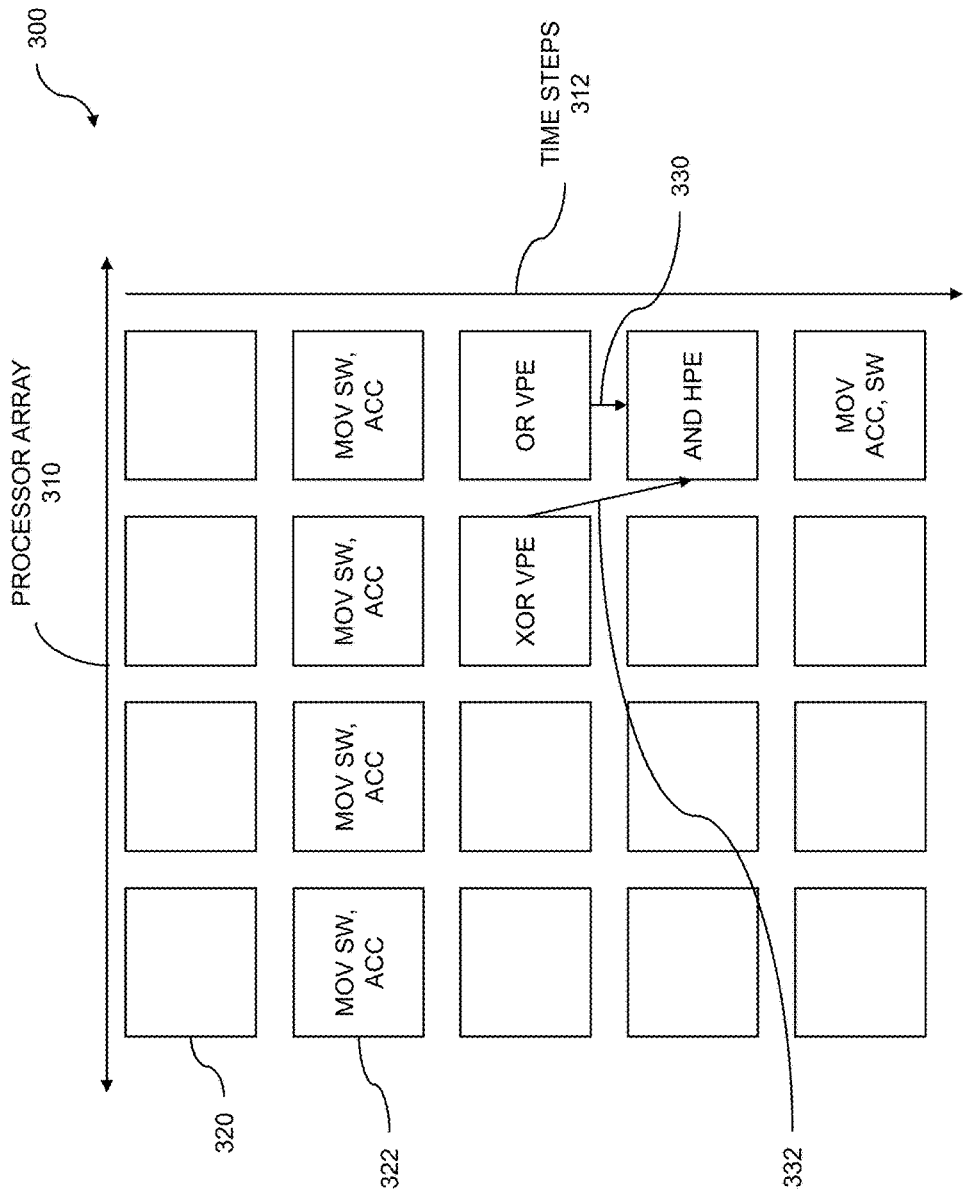
FIG. 3 shows interconnected processing elements over time.

FIG. 3 shows interconnected processing elements over time. The example 300 shows the mapping constraints of a three-dimensional (3D) solution space comprising the x and y physical location of processing elements along with the z dimension. Note that in the example 300, the x and y physical location is shown with all processing elements in one row, and that additional rows show the time dimension and not the further x-y dimension. Some processors 310 from an array of processing elements are shown. The processors 310 represent a subset of the processors available in the array. The processors 310 can be used for different purposes, shown moving forward in time over time steps 312. A processor 320 from the array of the processors 310 can be configured for various purposes over time. The processors 310 can be configured to pluralities of processors for the various purposes, where the various purposes can include computation, communication, storage, etc. A dataflow graph can be executed using the various processing elements across the series of time steps 312. For example, a first plurality of processors can be used for computational purposes, a second plurality of processors can be used for communications purposes, a third plurality of processors can be used for storage operations, and so on. The first plurality of processing elements, the second plurality of processing elements, the third plurality of processing elements, and so on, can be coordinated across the series of time steps 312. The purpose of a given processor or of the pluralities of processors can change over time. Elements from the first plurality of processing elements, which were at first configured to processing purposes, can be used for communication purposes at a subsequent time step, for example. Similarly, in another example, elements from the first plurality of processing elements can be used for storage purposes at a subsequent time step, and so on. Elements from the second plurality of processing elements which were at first configured to serve a communication purpose can be used for computational purposes at a subsequent time step. Similarly, elements from the second plurality of processing elements can also be used for storage purposes at a subsequent time step, and so on. In some embodiments, a time step can be referred to as a tic or a sub-tic. In essence, a time step is a period of time over which logic signals are maintained or are settled to specific values. In embodiments, the processing elements are synchronized within a time step. In embodiments, the solving the instructions is across a set of sub-tics within the reconfigurable fabric.

The example 300 shows that some or all of the processing elements of the array of processing elements can be used for computational purposes. For example, a processing element 322 can be assigned a move instruction in order to set up input data. Similarly, any number of other processing elements can be configured to computational purposes. As the time over time steps 312 progresses, additional nodes of the flow graph can be assigned to be executed by processing elements of the array of processing elements. While the processing element 322 remains idle for the remaining time steps of this example, it might not remain idle while executing other flow graphs. The processing element 322 and the other processing elements can be assigned new tasks. Data can also be transferred, moving forward in time. The arrows 330 and 332 can indicate two such data transfers, moving forward in time. Any other number of data transfers can occur. In some embodiments, data output from one processing element in the third plurality of processing elements configured for storage operations can be used as an input to another processing element that is part of the first plurality of processing elements or the second plurality of processing elements, configured for computational purposes or communication purposes, respectively. Data can be stored and transferred using various communication techniques, including synchronous and asynchronous techniques. In embodiments, communication from one processing element to a second processing element can be accomplished via an accumulator input on the second processing element.

Data transfer is a critical element of reconfigurable fabric performance. Data transfer, or data transport or data propagation, describes the way in which data enters and exits the reconfigurable fabric, as well as how data is routed between and among the various processing, memory, and storage elements within the reconfigurable fabric. In some embodiments, input data is obtained from a neighboring processing element, such as is indicated by arrow 332. In other embodiments, input data is obtained from outside of the reconfigurable fabric, such as input data for a processor, or processing element, 320, which is shown during the initial time step of example 300. In those embodiments, input data arrives not from another processing element, but rather from memory outside of, or data transfers that originate outside of, the reconfigurable fabric. Thus, in embodiments, input data to the dataflow graph is obtained directly from a processing element within the plurality of processing elements. And in embodiments, input data to the dataflow graph is obtained from outside the reconfigurable fabric. Likewise in embodiments, output data from the dataflow graph is propagated directly to a processing element within the plurality of processing elements. And in embodiments, output data from the dataflow graph is propagated outside the reconfigurable fabric.

Figure 4:
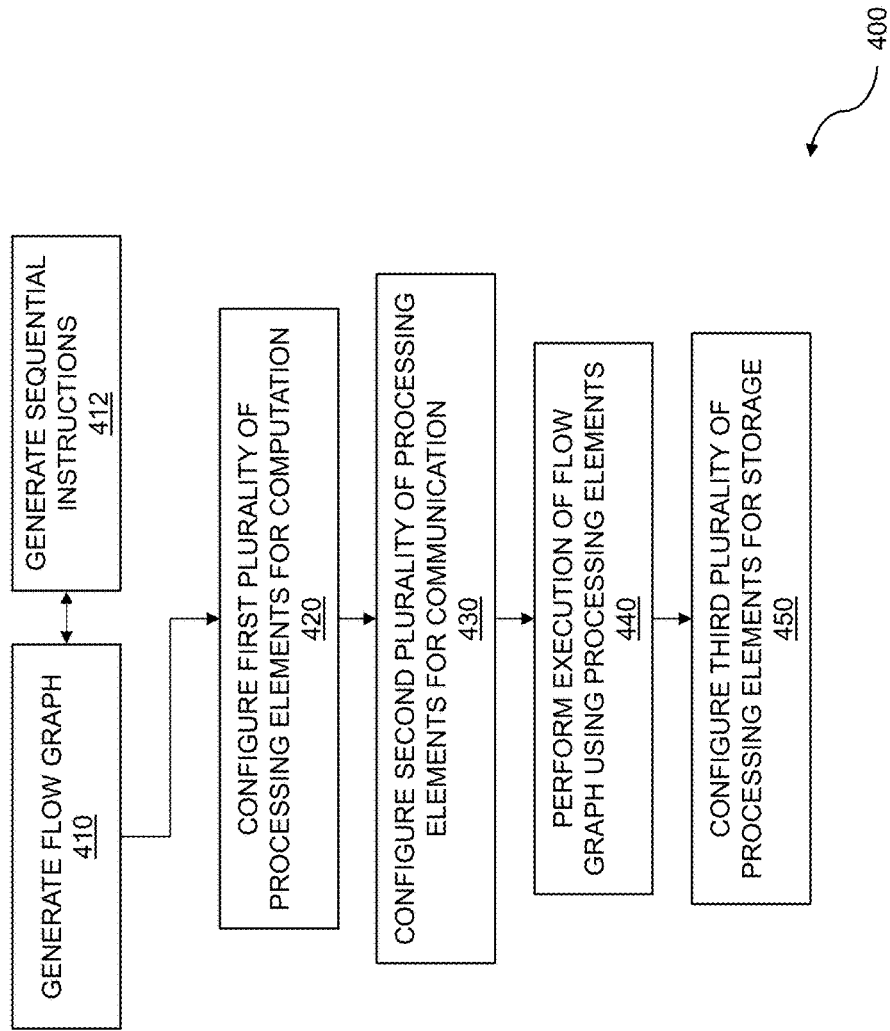
FIG. 4 is a flow diagram for flow graph usage in configuration of resources.

FIG. 4 is a flow diagram for flow graph usage in the allocation and/or configuration of resources. The flow 400 shows configuring a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints. In embodiments, the routing resources comprise a second plurality of processing elements and also provide for communication within the first plurality of processing elements.

The flow 400 includes generating the flow graph 410. In embodiments, the flow graph is generated using a flow graph generation tool, a portion of which can be generated using an automated flow graph generation tool. The flow graph can be formed using a variety of graphical techniques, textual techniques, numerical techniques, etc. The flow graph can be described in an executable format. The translating can include generating sequential instructions 412. The sequential instructions can perform various processing operations related to the flow graph. The instructions can be directly executable by a processing element, interpretable by the processing element, etc. Based on the flow graph, groupings or blocks of sequential operations can be identified for parallel execution on two or more processing elements. A flow graph can include elements that are referentially transparent, where operation results can be replaced with the values that the operations generate, executed in parallel, and so on. The flow graph can include a control dataflow graph (CDFG). The control dataflow graph can include nodes and arcs, where the nodes can represent operations of code and the arcs can represent redirections of control and/or data resulting from the operations. In embodiments, the CDFG can include entry (i.e. initial) blocks, and exit (i.e. terminal) blocks. The CDFG can include sequential operations where code executes without jumps, redirections, and so on. Based on the CDFG, two or more operations can be executed in parallel on two or more processing elements. The flow graph can include a hypergraph. The hypergraph can by definition include graph edges connecting numerous vertices; for example, a hypergraph can include edges connecting three vertices. The hypergraph can also include a generalized representation of the graph.

The flow 400 includes configuring a first plurality of processing elements within an array, based on the flow graph, for computational purposes 420. In embodiments, the flow graph, which can include a control dataflow graph (CDFG), a hypergraph (HG) and so on, can represent various operations in code, as described above. The operations can be represented by nodes of a graph, a CDFG, a HG, and so on. The one or more operations in code can be configured to one or more processing elements within an array. The processing elements within the array can be substantially similar, thus simplifying the allocation/configuration process. The allocation of the operations to the processing elements of the array can include a subset of the processing elements, or all of the processing elements. In a situation where the number of operations exceeds the number of processing elements available for computational purposes, a schedule can be imposed to orchestrate the order in which the operations are executed. The schedule can include grouping operations in the order in which they can be executed on a given processing element. The scheduling technique can be based on optimization techniques, on randomization and selection techniques, on best-available techniques, and so on.

The flow 400 includes configuring a second plurality of processing elements, based on the flow graph, for communication purposes 430, including communication between the first plurality of processing elements. The communication purposes can include communication between nodes of the flow graph (e.g. two nodes), communication among nodes of the HG (e.g. three or more nodes), and other communication purposes. The various arcs of the graph, the CDFG, the HG, etc., can describe the communications purposes of the flow graph. The configuring of the second plurality of processing elements can include some or all of the processing elements of the array, some or all of the remaining processing elements not configured to the first plurality of processing elements, and the like. Elements from the first plurality of processing elements and elements from the second plurality of processing elements can be substantially similar. The substantial similarity can include similarities in processing power and other computational capabilities, communications capabilities, and so on. The substantial similarity can simplify the techniques used for configuring the first plurality of processing elements of the array and the configuring of the second plurality of processing elements of the array. In embodiments, the configuring of the first plurality and/or the configuring of the second plurality are accomplished, in part, by a user pre-configuring certain of the processing elements. In embodiments, a user can write assembly code, or some other type of code, to work around an automation problem in the configuring or to perform some configuring in a manner preferable to a designer. Elements from the first plurality of processing elements and elements from the second plurality of processing elements can be interchangeable. For example, based on a first graph, processing elements of the array might be configured to a first plurality and to a second plurality as needed. In the same manner, only based on a second graph, processing elements of the same array can be configured differently to the first plurality and to the second plurality, thus simplifying the process of allocation and/or configuration by using interchangeable, substantially similar processing elements. Additionally, the configuring of the first plurality and the second plurality can be based on any of a variety of scheduling techniques. The scheduling techniques can be optimized based on numerous factors. For example, some embodiments include configuring the first plurality and the second plurality using static scheduling, when static scheduling best fulfills objectives for a particular design. Conversely, configuring the first plurality and the second plurality can be accomplished by dynamic scheduling, random assignment/best-selection scheduling, best-available scheduling, and so on, as dictated by the design objectives. Any appropriate scheduling technique can be used for the configuring of the first plurality of processing elements and the second plurality of processing elements.

The flow 400 can further include performing execution of the flow graph using the first plurality of processing elements and the second plurality of processing elements 440. The performing execution of the flow graph can include performing sequential instructions using the first plurality of processing elements. The sequential instructions can include the operations as described above, with a given processing element of the first plurality of processing elements able to execute one or more operations based on the flow graph, the CDFG, the HG, and so on. The executing of the operations can include direct execution of the code, interpretation of the code, and so on. The performing execution of the flow graph can include communicating among the first plurality of processing elements using the second plurality of processing elements—the elements previously designated to perform communication. The performing execution can be based on a schedule, where the schedule can be a static schedule, a dynamic schedule, and so on. In some cases, the execution can be based on two or more types of scheduling.

The flow 400 can further comprise configuring a third plurality of processing elements within the array for storage operations 450. The storage operations can be determined by the storage requirements of the flow graph, the CDFG, the HG, and so on. The storage operations can also be determined by instructions to place or pull certain data from a storage location. The storage operations can include storing input data, output data, intermediate data, partial data, results, and so on. The data which is stored can be binary data, numerical data, textual data, graphical data, or any other form of data appropriate to the flow graph, CDFG, HG, etc., which is being executed. The configuring of the third plurality of processing elements can include configuration of some or all of the processing elements of the array, configuration of some or all of the remaining processing elements not configured to the first plurality of processing elements and to the second plurality of processing elements, etc. The configuring of the third plurality of processing elements can be based on a schedule, where the schedule can be static, dynamic, and so on. The schedule can be optimized, randomly assigned/selected, that which is available, and so on. Various steps in the flow 400 may be changed in order, repeated, omitted, or the like without departing from the disclosed concepts. Various embodiments of the flow 400 may be included in a computer program product embodied in a non-transitory computer readable medium that includes code executable by one or more processors.

Figure 5:
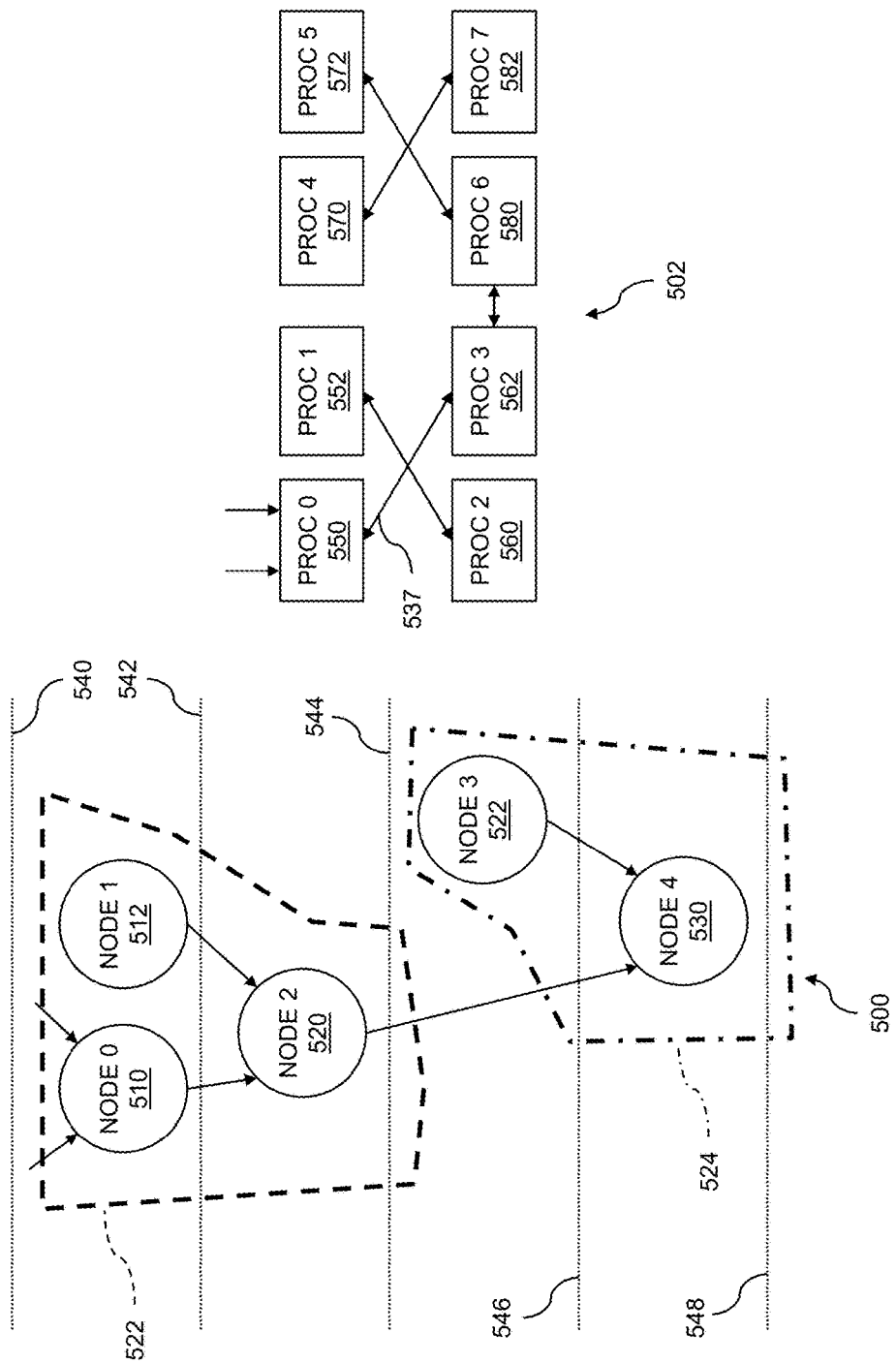
FIG. 5 shows a dataflow graph and interconnected processors.

FIG. 5 shows a dataflow graph 500 and interconnected processors 502. The dataflow graph 500 comprises a plurality of nodes. A plurality of edges interconnects the nodes. Node 0 510, node 1, 512, and node 2, 520 are grouped into a sub-problem 522. Similarly, Node 3 522 and node 4 530 are grouped into a second sub-problem 524. In embodiments, the satisfiability solver may solve a first sub-problem, and can use the solution of the first sub-problem as an input to a second sub-problem. This allows for a scalable satisfiability solver that can accommodate complex configurations of a reconfigurable fabric.

The interconnected processors include processor 0 550, processor 1 552, processor 2 560, processor 3 562, processor 4 570, processor 5 572, processor 6 580, and processor 7 582. The processors are interconnected by communication links, shown illustratively as 537, et al. The processors can be configured to implement the process specified by the dataflow graph 500. However, there typically is not a one-to-one relationship between the number of processors and the number of nodes in the dataflow graph 500. The illustration shows performing data computation based on the dataflow graph using the first plurality of processing elements and the routing resources.

The dataflow graph (DFG) 500 can also be visualized with partitions over time as shown by illustrated times 540, 542, 544, 546, and 548. A time partition can be established between times 540 and 544. The DFG is solved for satisfiability over all nodes and edges included within times 540 and 544, namely node 0 510, node 1 512, and node 2 520. This time partition coincidentally includes the same nodes and edges as sub-problem 522. However, the time partition can be slid forward in time to be established between times 542 and 546. This new time partition now includes node 2 520 and node 3 522, which are not included in any sub-problems. Solving constraints within the time partition designated by times 542 and 546 can yield a different satisfiability solution than found in sub-problem 522 and therefore move the overall SAT solution towards global completeness. The time partition can also be moved further forward to be established between times 544 and 548. In this manner, satisfiability can be achieved without having to store/solve the entire DFG at once, which is often impossible due to its complexity.

In embodiments, to facilitate compilation of bigger programs with high quality of the obtained solution while still maintaining reasonable compilation time, the overall complexity of a single SAT-problem can be bounded. SAT usually exhibits exponential runtime explosion at some point, so the goal is to break down the overall problem into a series of smaller ones such that the solver is able to achieve a solution for each sub-problem in a time that is bounded by a constant. In order to do so, the SAT-inherent paradigm of all-or-nothing has to be avoided; a set up where compilation may result either in good or in no output is not acceptable. In embodiments, a time-sliced compilation process of repeated SAT-based optimization to achieve scalability and robustness is employed.

The compilation step is broken into a series of packing problems on overlapping time slices. Overlapping sub-tic intervals can be defined as $I0=[l0, u0]$, $I1=[l1, u1]$, ..., $In=[ln, un]$, where $li<li+1<ui<ui+1$, which are worked individually. A set Q of templates are already selected to be part of a final solution where $Q=\{\ \}$ at the beginning. Dataflow graph nodes that have an associated template q in Q can be designated realized and nodes that do not have a template can be designated unrealized. The iterative process is complete when all nodes are realized. When processing an interval $Ii=[li, ui]$, the following invariants hold:

Invariant 1: for every template q in Q and all reservations (r, s, t) referenced by q as inputs or outputs, there is $t<=ui-1$ Invariant 2: for every reservation (r, s, t) that is referenced as an input of a template associated with an unrealized node, there is either an unrealized node that has an output template (r', s, t') or there is a reservation (r', s, t') in a realized template where $t'>=li$.

Invariant 3: the set of templates in Q satisfies all constraints from the SAT-model except that cloning constraints are restricted to realized nodes only.

Invariant 1 ensures that the partial solution Q is restricted to the set of already processed sub-tics. Invariant 2 ensures that the input constraints for any potential consumer template can be satisfied either by generating the signal or routing it to a resource. Invariant 3 ensures that the partial solution is legal with respect to all constraints imposed by a global SAT model.

When processing the interval $Ii=[li, ui]$, a SAT model is created as follows:

Step 1: build a SAT model, but restricted to the time interval [l0, ui] and cloning constraints relaxed to "at most one" instead of "equal one."

Step 2: add constraints that ensure that Invariant 2 holds with respect to the upper sub-tic ui in any solution of the SAT model.

Step 3: add constraints that ensure that every template q in Q is part of the solution.

Step 4: add constraints that ensure that no template p not in Q that references any reservation (r, s, t) with $t<li$ or $t>ui$ is part of the solution.

Step 1 ensures that all constraints of the global SAT-model are adhered to except that certain nodes will not be realized in the solution of the partial model; rather they will be realized in a subsequent iterations. Step 2 ensures that the partial solutions can be "stitched" together by ensuring that all signals that are needed as inputs of still unrealized nodes can be generated or moved to required input resources. Step 3 ensures that the partial solution is not reduced anymore. Step 4 ensures that all templates that may be applied in a solution of this partial problem are properly contained within the current time slice.

In this way, constructing a SAT model for a time slice can be efficiently executed. For the time interval [l0, li], no template that is not yet in Q needs to be considered and the latter will be associated with Boolean variables that are fixed to "true." Therefore, SAT model complexity is bounded by the number of templates within li only.

An integral linear objective is formulated that counts the weighted number of node templates that are applied in a solution of this partial model and are not yet part of Q. The weight of each template reflects the number of processor instructions that it represents. Optimizing with respect to this objective will cause as many instructions as possible to be packed into the current time slice, except for pure MOV instructions, which are used in routing templates because these templates are only necessary when signals require removal from one resource to the other in order to serve as inputs for node templates.

In order to guide such an optimization approach safely to low latency compiled code, a second linear term can be added that takes into account the timing criticality of not yet realized nodes. Timing criticality can be directly inferred from an "as late as possible" (ALAP) analysis for each node template. Based on this, individual templates can be classified by timing criticality, and this can be reflected by another integral objective where the goal is to minimize the timing criticality of not realized nodes in the solution. Both objectives can then be combined by a weighting factor that ensures that timing fully dominates the objective but is cut-off at a point where nodes are not deemed "timing-critical". Encoding this integral linear objective efficiently as pure SAT-clauses can be done in various ways. This approach can bound the size of the SAT optimization problem that must be solved within each step. In this way, the optimization starts with very easy solvable problems and incrementally works towards more difficult ones. A valid initial solution for every optimization is usually not to pack any additional non-routing templates into the current time interval but to simply ensure that content, generated by already applied templates in the lower sub-tics and required by not yet realized nodes, is transferred to the upper boundary of the time interval using routing templates. There can be an easy solution for this: just move content straight up in time without changing the occupied resource. Starting from an easy initial solution, the optimization then exploits the search space finding more and more dense configurations that pack additional non-routing templates into the time interval. While doing so, the SAT solver efficiently updates its internal database of learned clauses, thus making the search process more and more effective. The finally obtained solutions then achieve a very efficient assignment of instructions to processors.

Figure 6:
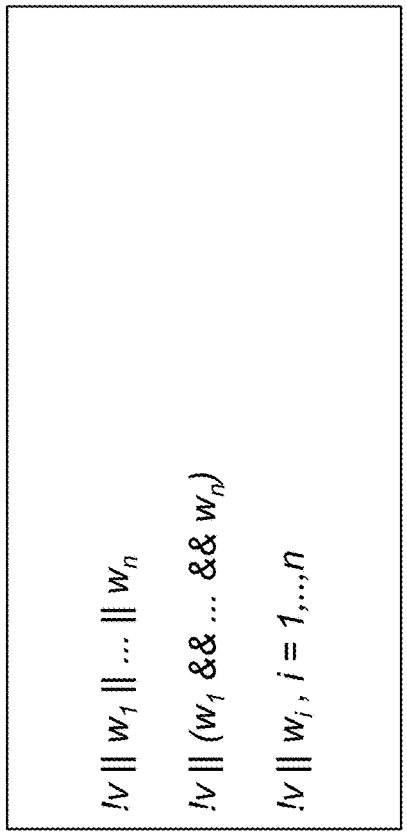
FIG. 6 illustrates equations for propagation and computation.

FIG. 6 illustrates equations for propagation and computation. The equations 600 show satisfiability solver techniques that comprise learning across variables and clauses. In embodiments, the satisfiability model includes variables, clauses, and the conjunction of clauses.

A common challenge when dealing with SAT-formulations is the bookkeeping of variables. At the SAT-solver level, variables serve as integer indices without any specific meaning or context. However, when building a SAT-model, or interpreting a solution of a SAT-model, it is necessary to have an interpretation of a variable that provides some external context about what a setting of true/false means to that variable. It also can be beneficial to identify and retrieve variables by context for situations when the model generation process repeatedly refers to this same context while building all the different clauses. Disclosed embodiments provide a bookkeeping mechanism for allocating variables and their context. In embodiments, the bookkeeping mechanism is a dynamic demand-driven method. This enables allocation of so-called registered and unregistered variables.

Unregistered variables serve as intermediate Boolean variables that are needed for the encoding of some specific clauses or optimization objectives. They are known only in the local context of some clause generation method and have a semantic meaning only within these methods. Their value in a solution that is generated by the SAT-solver will be disregarded (it is not known any more what they mean). An example would be encoding of a constraint like a ||b||c||d||e|| (f && g): In order to translate this into disjunctions (which is the only clause type natively supported by the solver), a new intermediate variable x is created and the encoding of the constraint as disjunctions such as:

!x||f
!x||g
a||b||c||d||e||x

When the SAT-solver returns a solution, the value of x is not relevant on the caller's side for the interpretation of the solution. If for any reason, another constraint has to be encoded that also needs computation of the sub-expression f && g, then a new unregistered variable x' will be created to express f && g again. Such duplicate clauses and variables can be efficiently detected and simplified at the core SAT-solver level.

Figure 7:
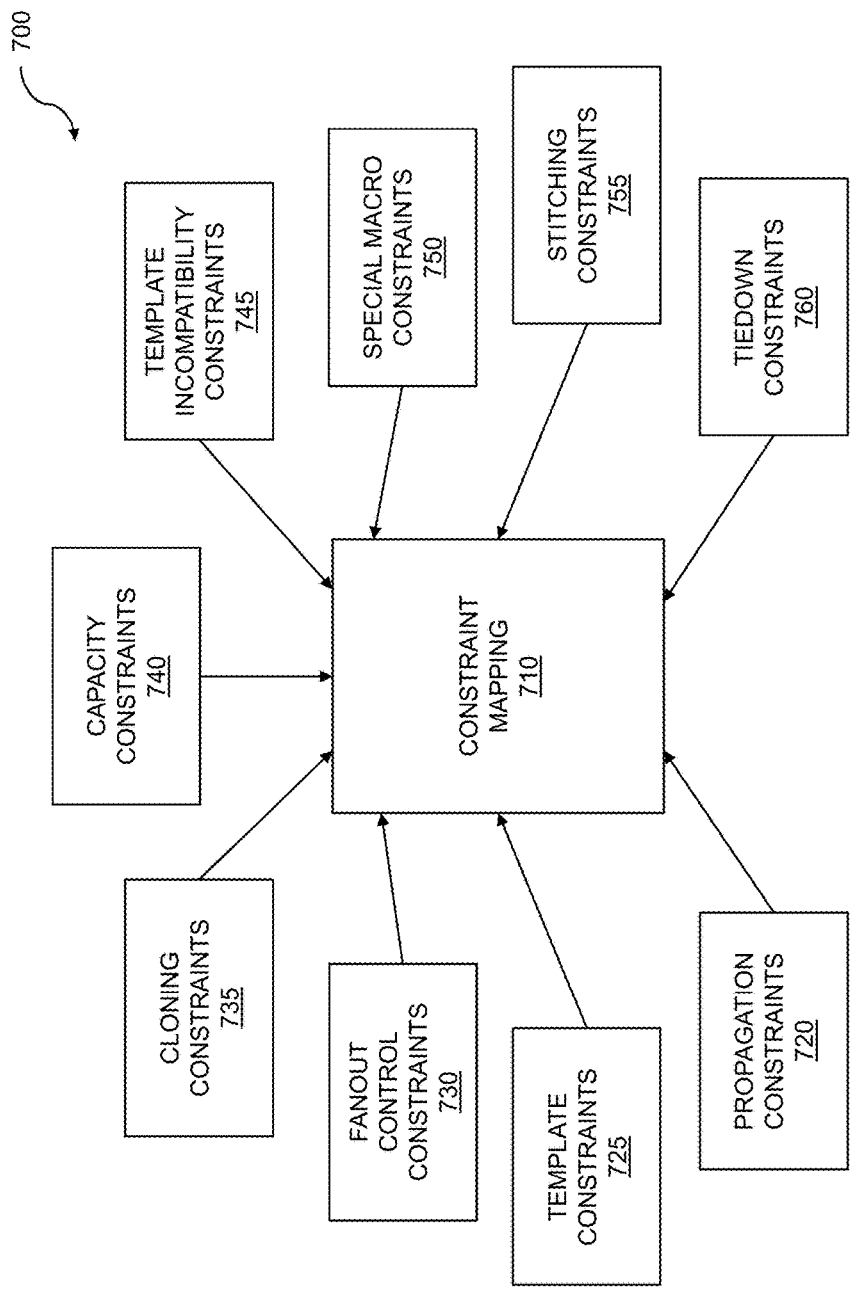
FIG. 7 is a block diagram of constraints feeding into constraint mapping.

FIG. 7 is a block diagram 700 of constraints feeding into constraint mapping. A variety of constraints can be utilized in the constraint mapping 710. The diagram illustrates the aggregation of mapping constraints that comprise instructions for implementing a function on a processing element from the first plurality of processing elements. In embodiments, the mapping constraints prevent data collisions within the reconfigurable fabric.

Disclosed embodiments may utilize a logical concept referred to as a bucket. Buckets provide an abstracted view of a reconfigurable fabric that is well suited for mapping purposes. A bucket is a specification of a container that represents a certain amount of register and/or instruction slots over a certain sub-tic range. A bucket includes a specification of a container of registers and instructions. Buckets may be implemented as a read-only data structure with an exception that the sub-tic range where they are defined can be manipulated. This is sometimes convenient when a design gets compressed to minimum/low latency.

The diagram 700 includes propagation constraints 720. It specifies rules/constraints that must be satisfied whenever the specified signal appears at the specified bucket/sub-tic with the specified precision. In embodiments, a signal can be converted from 8-bit to 1-bit representation by using an instruction. This conversion is built into the propagation constraint generation. It assumes that a routing instruction exists that delivers a 1-bit value but accepts an 8-bit input.

In embodiments, this conversion is permitted if certain criteria are true. In embodiments, the conversion is permitted if the signal is initially computed as 8-bit value and has a consumer (sink) that requires 1-bit data width. In embodiments, the conversion is permitted if the signal is initially computed as a 1-bit value and data conversions are disabled.

In embodiments, a signal can be converted from 1-bit to 8-bit representation by using a "mov" instruction having "cr" as the source. This conversion is built into the propagation constraint generation. It assumes that a routing instruction exists that delivers an 8-bit value but accepts a 1-bit input.

The diagram 700 includes template constraints 725. This accommodates conditions for computing a signal at a specific space/time location. In embodiments, the process retrieves all PinData-records associated with the template from a Signals-interface and adds appropriate constraints. The PinData-records and Signals-interface can be part of a software library for program development for a reconfigurable fabric. The PinData-records and Signal-interface can include data structures, classes, and/or instantiation of objects for implementation of programs on a reconfigurable fabric.

In embodiments, the PinData-records describe the condition that a certain signal must be present at a specific bucket and sub-tic delta relative to the sub-tic of the computation variable. These records are encoded by simple 2-variable dual Horn clauses. In embodiments, the PinData-records describe the condition that a certain signal must be transferable into a specific bucket such that it is present at a certain sub-tic delta relative to the sub-tic of the computation variable. This means that there may be multiple sources where the signal to be transferred can be located which then results in a more complex dual Horn clause. In embodiments, the PinData-records specify that a certain variable must be present in all sub-tics.

The diagram 700 includes fanout control constraints 730. This process may add an at-most-one constraint for all fanout-control-sets that had been collected when adding the propagation constraints. The simplified fanout control mechanism requires collection of all potential target registers of an instruction and adding an at-most-one constraint to them.

There are some artifacts in the current solution, where a signal uses a register but the current lifetime analysis already excludes this location for the signal. Then the code that adds the propagation constraints will not process this location for this signal and therefore does not add this potential register usage to any fanout control set. This can cause inconsistencies leading to unsatisfiability later in the flow. Because of this, there is an initial loop in the method that examines any created registered variable and checks whether it has to be added to an already existing fanout-control-set.

The diagram 700 includes cloning constraints 735. In embodiments, the cloning constraints are utilized to ensure the following:

For each set of signal/template pairs that all have the same group cloning index (i.e. the signals are computed by the same node), all templates that are used in a solution have the same subgroup-cloning index (which ensures that all used templates will refer to the same xml-template and the same spatial/sub-tic placement of the underlying node).

For each set of signal/template pairs having the same group and subgroup index, either none or all of them are computed in a final solution. This is a necessary constraint for the flow where computations are iteratively packed. Once it has been decided to realize a node with a given xml-template by computing one specific signal, embodiments then immediately mark in the solution that all other signals are to be generated by the node with a compliant template.

For each set of signal/template pairs that all have the same group cloning index, at least one signal gets computed whenever a model is utilized that represents the full packing problem.

Embodiments perform incremental packing. However, lifetime analysis states that the maximum sub-tic for computation of the signal must be no later than the upper boundary of the section that is currently being processed.

The last set of constraints is important, as for example memory store operations may not generate any signal that is needed by some other consumer. They will not be realized, for example, in the macro-building flow because there is also no objective that works towards packing as many instructions as possible. Disclosed embodiments provide an explicit constraint that enforces that the synthetic signal is generated and computed.

The diagram 700 includes capacity constraints 740. The capacity constraints pertain to constraints on the number of ⅛-bit registers and ⅛-bit instructions that are used in a bucket.

The diagram 700 includes template incompatibility constraints 745. The template incompatibility constraints pertain to tuples (signal,bucket,subtic,templ), (signal',bucket',subtic',templ') of template computations that are mutually exclusive. In embodiments, this can be modeled by incompatibility clauses !v||!w where v and w are registered variables associated with VarType_Compute. Embodiments identify exclusive template pairs and for all pairs of registered variables that represent exclusive template computations, add such a constraint to the satisfiability solver. The VarType_Compute variables can be part of a software library for program development for a reconfigurable fabric. The VarType_Compute variable can include data structures, classes, and/or instantiation of objects for implementation of programs on a reconfigurable fabric.

Embodiments may utilize two phases for processing template incompatibilities. A first phase deals with template incompatibilities that are captured by the template incompatibility indices. Templates may have an associated incompatibility index and for each signal either every or no template has such an index. There is one Boolean variable assigned with any such index which indicates whether any template is used in the mapping that has this index. Then incompatibility clauses are added between pairs of such indices. A first loop in the method ensures that not only the templates are considered for which a registered variable of type VarType_Compute exists, but also that every signal is eventually computed. One out of all compatibility indices that are associated with a specific signals template must be true in any final solution. This additional constraint is needed in order to reflect specifically memory related incompatibilities.

For a memory, it may happen that all load/store operations will be considered only at a very late stage of an incremental mapping. This memory may be restricted by the user to be placed on a specific spatial location only. This location must not be used by any other memories where load/store operations will be already realized in an earlier stage of the incremental flow. This is achieved by adding a constraint that will trigger the existence of a certain incompatibility index in any solution (that reflects that the memory must use a specific location) and will ensure that no other memory operation with conflicting index will ever be realized.

The second phase of this method deals with the incompatibilities between individual pairs of templates. This utilizes the constraint encoding including clauses of type (!v||!w).

The diagram 700 includes special macro constraints 750. This relates to mappings where the result is intended to be used as a macro in another context. The special macro constraints are extra constraints that improve the accessibility of input/output pins of the generated macro. In order to do so, the following constraints are added. No output signal will be sent to the switch by a "mov X" instruction. There is no instruction on a processing element in a sub-tic when data was sent to the switch in the previous subtic. Finally, all input signals must be retrieved from the switch and routed into the cluster prior to the execution of any instruction that belongs to a mapped node.

The diagram 700 includes stitching constraints 755. In embodiments, the stitching constraints enable stitching of partial solutions in an iterative packing flow where mapping occurs on a sub-tic interval by sub-tic interval. As an example, consider a case of an iterative packing flow and a currently processed section that covers the sub-tic interval I=[minSubtic,maxSubtic]. Thus, the mapping up to minSubtic-1 has already been finalized, and the next step is to perform a mapping in the interval I such that the mapping on the next interval [minSubtic',maxSubtic'] with minSubtic<minSubtic'<maxSubtic<maxSubtic' will succeed as well.

Embodiments accomplish this by establishing one or more "boundary conditions" for the upper boundary of the current section. The fundamental principle used here focuses on signal computation and signal consumption for propagated signals: A (propagated) signal s is computed whenever one of the registered variables associated with that signal is set. There may be now other signals s' that have computation templates that depend on the presence of signal s (s is an input signal to these templates). Signal s is consumed by a dependent signal s' if also one of the template computation variables for s' is true. Signal s is fully consumed when all signals dependent on s have a computation variable set to true (which means that signal s is no longer needed).

For the example interval I of interest and a propagated signal s, one of the following must be true:

s is not computed in a sub-tic in [0,maxSubtic];

s is fully consumed in the interval [0,maxSubtic]; or

There must be a sub-tic close to maxSubtic where s occupies a register in some bucket.

The last condition ensures the availability of signal s for dependent signals s' that will be computed in later sub-tics that are not part of the current sub-tic interval.

Some embodiments create additional variables that indicate whether a specific signal is computed in [0,maxSubtic] and whether it is fully consumed in [0,maxSubtic] and adding a clause that in case the first variable is true and the second one is false enforces that some registered variable for the signal that refers to usage of a register at maxSubtic must be true.

In order to generate the computed/consumed variables, it is necessary to take the variables in the solution into account as the current interval I models only a subset of [0,maxSubtic]. As it is cumbersome to look at various sets of variables, solution variables are simply added to the current set of registered variables.

The diagram 700 includes tiedown constraints 760. In embodiments, registered variables that are not within the current section are tied to false if they are not part of the currently stored solution, or to true otherwise. This ensures that an existing solution is not modified outside the current section. Furthermore, any registered variable that denotes the usage of a register or an instruction outside the currently valid lifetime interval of the signal is tied to false. A similar procedure occurs for any registered variable that denotes the computation of a signal by a template outside of the currently valid computation interval.

Figure 8:
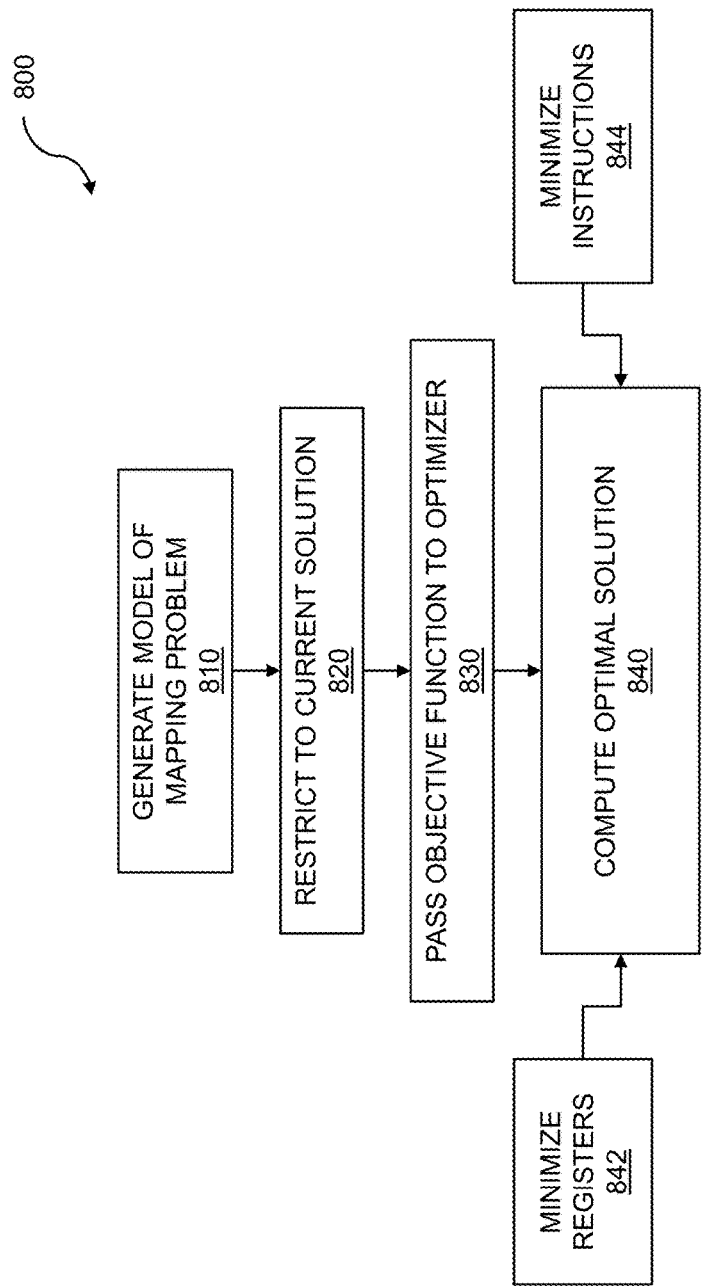
FIG. 8 is a flow diagram of trimming processes within satisfiability.

FIG. 8 is a flow diagram of trimming processes within satisfiability. The flow 800 includes generating a model of a mapping problem 810. The flow 800 further includes restricting a solution to a current solution 820. The flow further includes passing an objective function to an optimizer 830. This targets minimization of used registers and instructions. The flow then continues with computing an optimal solution 840. The flow can further include minimizing registers 842, and/or minimizing instructions 844. Various steps in the flow 800 may be changed in order, repeated, omitted, or the like without departing from the disclosed concepts. Various embodiments of the flow 800 can be included in a computer program product embodied in a non-transitory computer readable medium that includes code executable by one or more processors.

Figure 9:
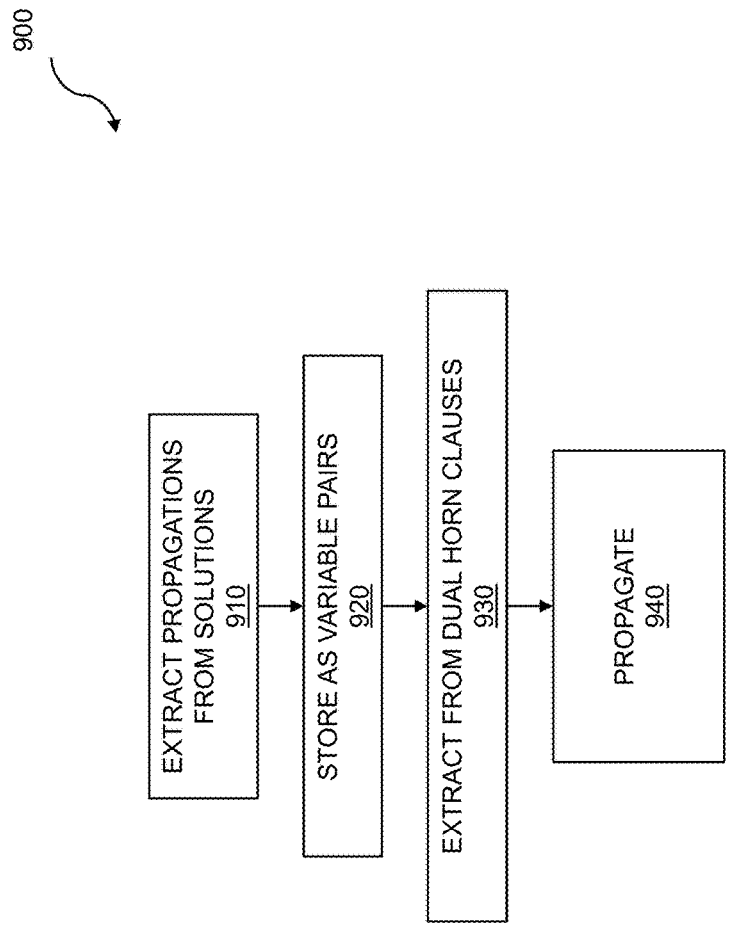
FIG. 9 is a flow diagram of decoding propagations.

FIG. 9 is a flow diagram of decoding propagations. The flow 900 includes extracting propagations from solutions 910. This can include retrieving the data propagations from the solution that define routing instructions or source/sink bindings that are added/applied when writing the final mapping. The flow further includes storing solutions as variable pairs 920. The flow further includes extracting information from dual Horn clauses 930. The information can include extracting one or more valid propagations. The flow then continues with propagation 940. Various steps in the flow 900 may be changed in order, repeated, omitted, or the like without departing from the disclosed concepts. Various embodiments of the flow 900 can be included in a computer program product embodied in a non-transitory computer readable medium that includes code executable by one or more processors.

Figure 10:
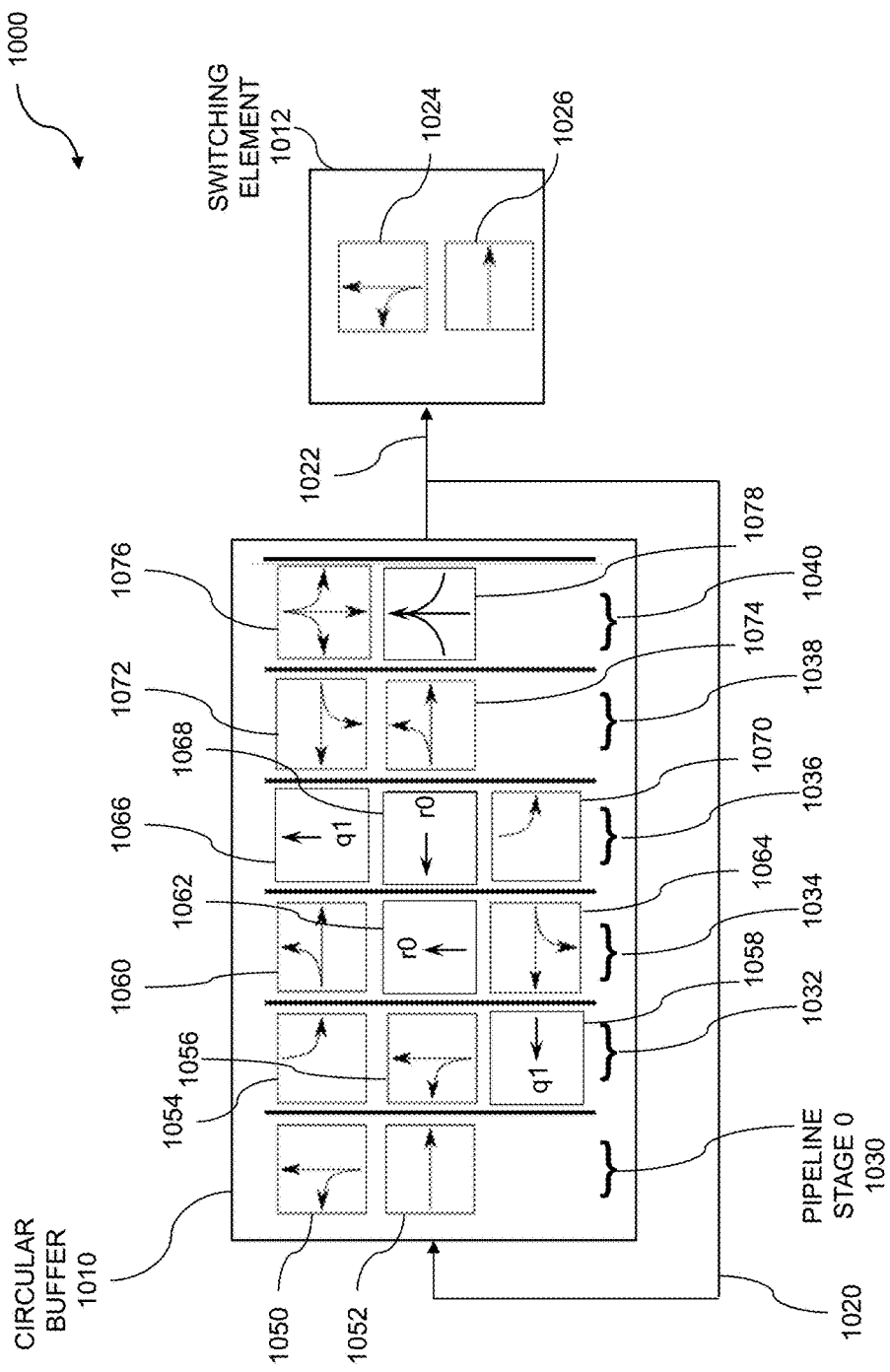
FIG. 10 shows a circular buffer with instructions.

FIG. 10 shows a circular buffer with instructions. A block diagram 1000 of a circular buffer 1010 is shown, as well as a corresponding switching element 1012. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 1000 describes a processor-implemented method for data manipulation. The circular buffer 1010 contains a plurality of pipeline stages. Each pipeline stage contains one or more instructions, up to a maximum instruction depth. In the embodiment shown in FIG. 10, the circular buffer 1010 is a 6×3 circular buffer, meaning that it implements a six-stage pipeline with an instruction depth of up to three instructions per stage (column). Hence, the circular buffer 1010 can include one, two, or three switch instruction entries per column. In some embodiments, the plurality of switch instructions per cycle can comprise two or three switch instructions per cycle. However, in certain embodiments, the circular buffer 1010 supports only a single switch instruction in a given cycle. In the block diagram 1000 shown, Pipeline Stage 0 1030 has an instruction depth of two instructions 1050 and 1052. Though the remaining pipeline stages 1-5 are not textually labeled in the diagram 1000, the stages are indicated by callouts 1032, 1034, 1036, 1038, and 1040. Pipeline stage 1 1032 has an instruction depth of three instructions 1054, 1056, and 1058. Pipeline stage 2 1034 has an instruction depth of three instructions 1060, 1062, and 1064. Pipeline stage 3 1036 also has an instruction depth of three instructions 1066, 1068, and 1070. Pipeline stage 4

1038 has an instruction depth of two instructions 1072 and 1074. Pipeline stage 5 1040 has an instruction depth of two instructions 1076 and 1078. In embodiments, the circular buffer 1010 includes 64 columns.

During operation, the circular buffer 1010 rotates through configuration instructions. The circular buffer 1010 can dynamically change operation of the logical elements based on the rotation of the circular buffer. The circular buffer 1010 can comprise a plurality of switch instructions per cycle for the configurable connections.

The instruction 1052 is an example of a switch instruction. In embodiments, each cluster has four inputs and four outputs, each designated within the cluster's nomenclature as "north," "east," "south," and "west" respectively. For example, the instruction 1052 in the diagram 1000 is a west-to-east transfer instruction. The instruction 1052 directs the cluster to take data on its west input and send out the data on its east output. In another example of data routing, the instruction 1050 is a fan-out instruction. The instruction 1050 instructs the cluster to take data from its south input and send out on the data through both its north output and its west output. The arrows within each instruction box indicate the source and destination of the data. The instruction 1078 is an example of a fan-in instruction. The instruction 1078 takes data from the west, south, and east inputs and sends out the data on the north output. Therefore, the configurable connections can be considered to be time multiplexed.

In embodiments, the clusters implement multiple storage elements in the form of registers. In the example 1000 shown, the instruction 1062 is a local storage instruction. The instruction 1062 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

In embodiments, one or more switching elements of one or more clusters of switching elements can be placed into a sleep state. A switching element can enter a sleep state based on processing an instruction that places the switching element into the sleep state. The switching element can be woken from the sleep state as a result of valid data being presented to the switching element of a cluster. Recall that a given switching element can be controlled by a circular buffer. The circular buffer can contain an instruction to place one or more of the switching elements into a sleep state. The circular buffer can remain awake while the switching element controlled by the circular buffer is in a sleep state. In embodiments, the circular buffer associated with the switching element can be placed into the sleep state along with the switching element. The circular buffer can wake along with its associated switching element. The circular buffer can wake at the same address as when the circular buffer was placed into the sleep state, at an address that can continue to increment while the circular buffer was in the sleep state, etc. The circular buffer associated with the switching element can continue to cycle while the switching element is in the sleep state, but instructions from the circular buffer may not be executed. The sleep state can include a rapid transition to sleep state capability, where the sleep state capability can be accomplished by limiting clocking to portions of the switching elements. In embodiments, the sleep state can include a slow transition to sleep state capability, where the slow transition to sleep state capability can be accomplished by powering down portions of the switching elements. The sleep state can include a low power state.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is completed. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code on which the element starts to execute. A cluster can be awoken during a DMA operation by the arrival of valid data. The DMA instruction can be executed while the cluster remains asleep as the cluster awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 1058 is a processing instruction. The instruction 1058 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 1000 shown, the circular buffer 1010 rotates instructions in each pipeline stage into switching element 1012 via a forward data path 1022, and also back to a pipeline stage 0 1030 via a feedback data path 1020. Instructions can include switching instructions, storage instructions, and processing instructions, among others. The feedback data path 1020 can allow instructions within the switching element 1012 to be transferred back to the circular buffer. Hence, the instructions 1024 and 1026 in the switching element 1012 can also be transferred back to pipeline stage 0 as the instructions 1050 and 1052. In addition to the instructions depicted on FIG. 10, a no-op instruction or a sleep instruction can also be inserted into a pipeline stage. In embodiments, a no-op instruction causes execution to not be performed for a given cycle. In effect, the introduction of a no-op instruction can cause a column within the circular buffer 1010 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by stimulus external to the logical element and not based on the programming of the logical element. The external stimulus can include an input signal, which in turn can cause a wake up or an interrupt service request to execute on one or more of the logical elements. An example of such a wake-up request can be seen in the instruction 1058, assuming that the processor q1 was previously in a sleep state. In embodiments, when the instruction 1058 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 1066. In the case of the instruction 1066, data from the processor q1 is moved to the north output. In some embodiments, if Xs have been placed into the processor q1, such as during the instruction 1058, then Xs would be retrieved from the processor q1 during the execution of the instruction 1066 and applied to the north output of the instruction 1066.

A collision occurs if multiple instructions route data to a particular port in a given pipeline stage. For example, if instructions 1052 and 1054 are in the same pipeline stage, they will both send data to the east output at the same time, thus causing a collision since neither instruction is part of a time-multiplexed fan-in instruction (such as the instruction 1078). To avoid potential collisions, certain embodiments use preprocessing, such as by a compiler, to arrange the instructions in such a way that there are no collisions when the instructions are loaded into the circular buffer. Thus, the circular buffer 1010 can be statically scheduled in order to prevent data collisions. In embodiments, when the preprocessor detects a data collision, the scheduler changes the order of the instructions to prevent the collision. Alternatively, or additionally, the preprocessor can insert further instructions such as storage instructions (e.g. the instruction 1062), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the mem bit is reset to 0 and thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 11:
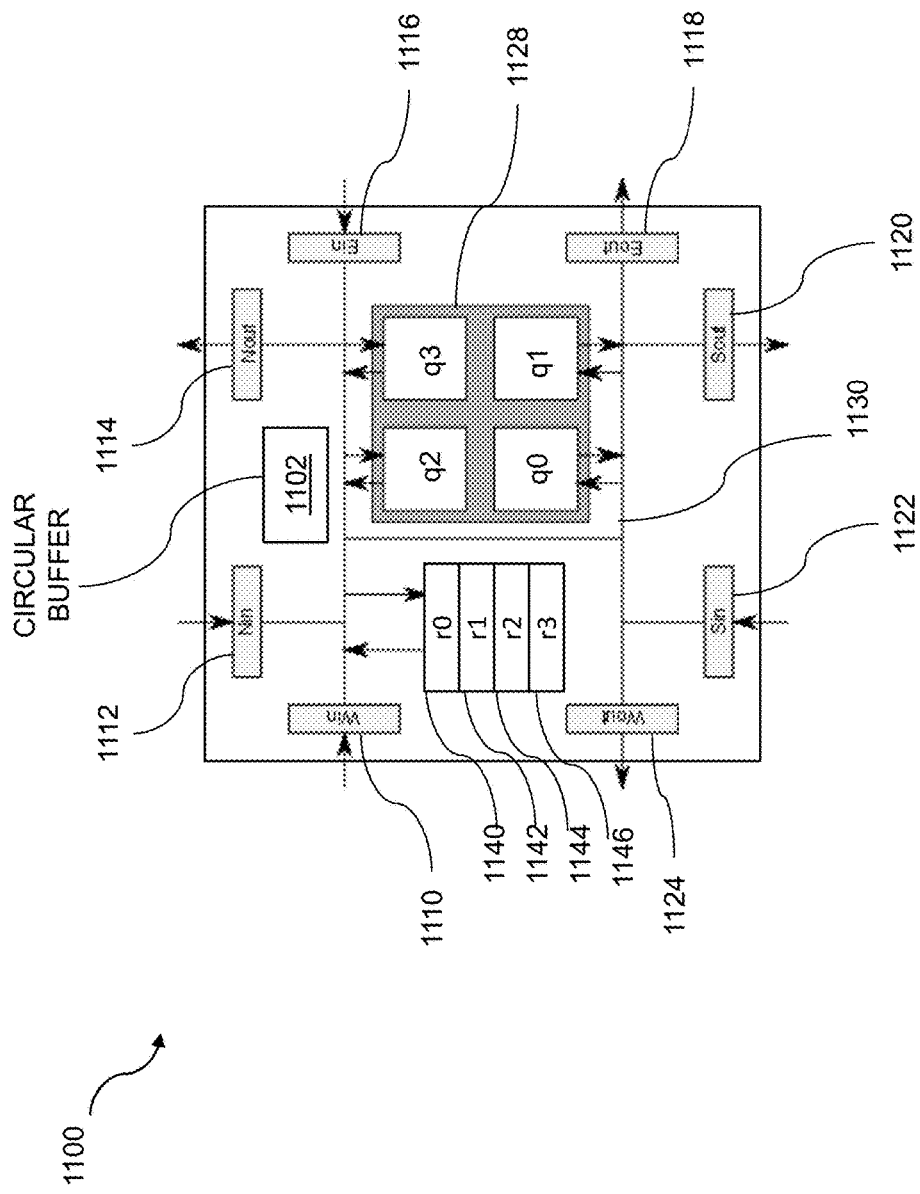
FIG. 11 illustrates quad processors within a processing element.

FIG. 11 illustrates quad processors within a processing element. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The cluster 1100 comprises a circular buffer 1102. The circular buffer 1102 can be referred to as a main circular buffer or a switch-instruction circular buffer. In some embodiments, the cluster 1100 comprises additional circular buffers corresponding to processing elements within the cluster. The additional circular buffers can be referred to as processor instruction circular buffers. The example cluster 1100 comprises a plurality of logical elements, configurable connections between the logical elements, and a circular buffer 1102 controlling the configurable connections. The logical elements can further comprise one or more of switching elements, processing elements, or storage elements. The example cluster 1100 also comprises four processing elements-q0, q1, q2, and q3. The four processing elements can collectively be referred to as a "quad," and jointly indicated by a grey reference box 1128. In embodiments, there is intercommunication among and between each of the four processing elements. In embodiments, the circular buffer 1102 controls the passing of data to the quad of processing elements 1128 through switching elements. In embodiments, the four processing elements 1128 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 1100 can further comprise storage elements coupled to the configurable connections. As shown, the cluster 1100 comprises four storage elements—r0 1140, r1 1142, r2 1144, and r3 1146. The cluster 1100 further comprises a north input (Nin) 1112, a north output (Nout) 1114, an east input (Ein) 1116, an east output (Eout) 1118, a south input (Sin) 1122, a south output (Sout) 1120, a west input (Win) 1110, and a west output (Wout) 1124. The circular buffer 1102 can contain switch instructions that implement configurable connections. For example, an instruction effectively connects the west input 1110 with the north output 1114 and the east output 1118 and this routing is accomplished via bus 1130. The cluster 1100 can further comprise a plurality of circular buffers residing on a semiconductor chip where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 1102. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 1124 to an instruction placing data on the south output 1120, such that the data can be output on both output ports within the same pipeline cycle. In a case where data needs to travel to a cluster that is both south and west of the cluster 1100, it can be more efficient to send the data directly to the south output port rather than storing the data in a register first, and then sending the data to the west output on a subsequent pipeline cycle.

An L2 switch interacts with the instruction set. A switch instruction typically has a source and a destination. Data is accepted from the source and sent to the destination. There are several sources (e.g. any of the quads within a cluster, any of the L2 directions (North, East, South, West), a switch register, one of the quad RAMs (data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in too many instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can implement any safe function of the two inputs. For example, the fan-in could implement a logical OR of the input data. Any output data is acceptable because the input condition is an error, so long as no damage is done to the silicon. In the event that a mem bit is set to '1' for both inputs, an output mem bit should also be set to '1'. A switch instruction can accept data from any quad or from any neighbor L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed either when the processors are running, or while the processors are in a low power "sleep" state. Accesses to the instruction RAMs and the PE and Co-Processor Registers may be performed during configuration mode. The quad RAMs may have a single read/write port with a single address decoder, thus allowing access to them to be shared by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

Figure 12:
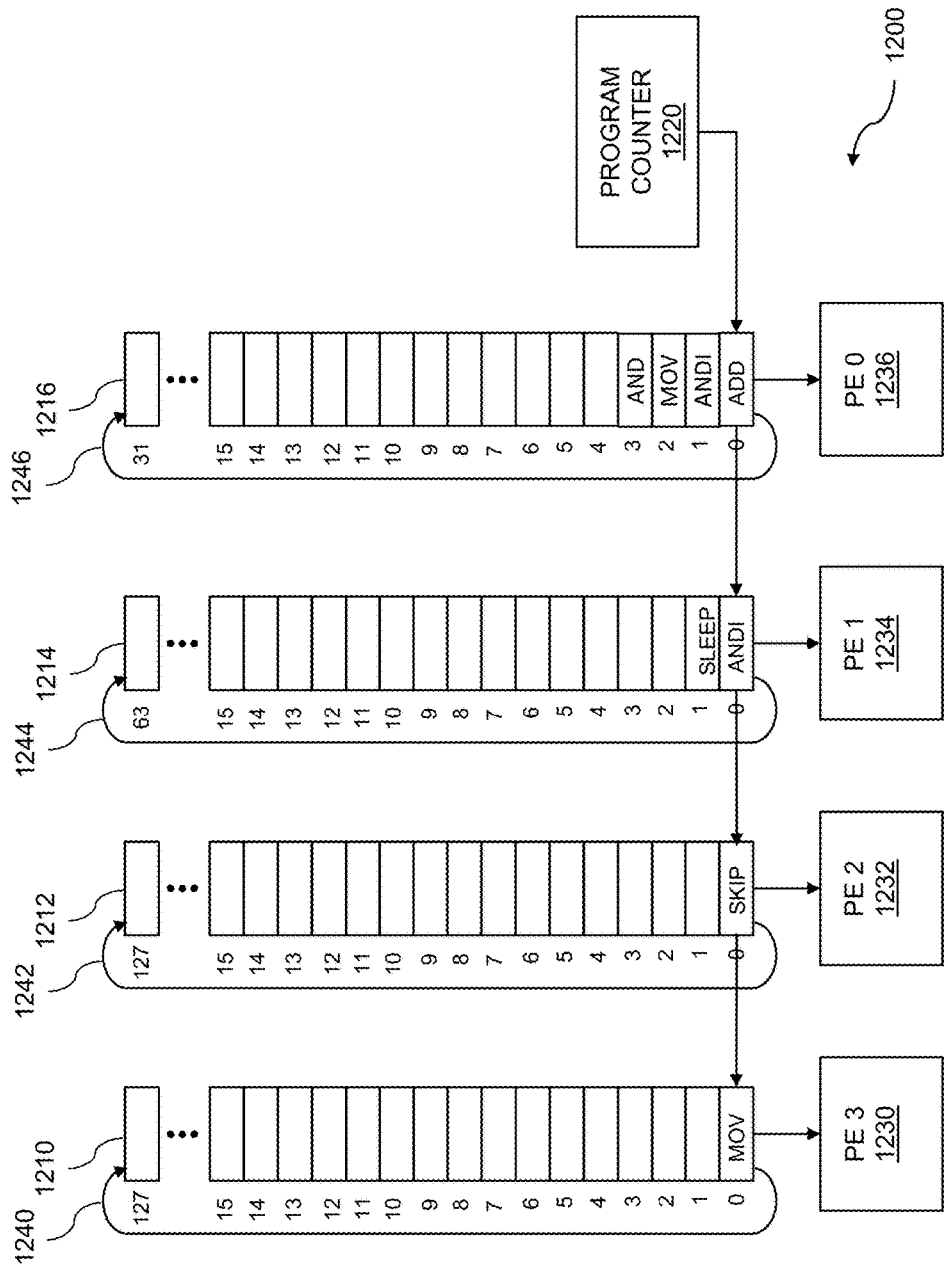
FIG. 12 shows a circular buffer with instructions.

FIG. 12 shows long circular buffer with instructions. This figure shows a diagram 1200 indicating example instruction execution for processing elements. A circular buffer 1210 feeds a processing element 1230. A second circular buffer 1212 feeds another processing element 1232. A third circular buffer 1214 feeds another processing element 1234. A fourth circular buffer 1216 feeds another processing element 1236. The four processing elements 1230, 1232, 1234, and 1236 can represent a quad of processing elements. In embodiments, the processing elements 1230, 1232, 1234, and 1236 are controlled by instructions received from the circular buffers 1210, 1212, 1214, and 1216. The circular buffers can be implemented using feedback paths 1240, 1242, 1244, and 1246, respectively. In embodiments, the circular buffer can control the passing of data to a quad of processing elements through switching elements, where each of the quad of processing elements is controlled by four other circular buffers (as shown in the circular buffers 1210, 1212, 1214, and 1216) and where data is passed back through the switching elements from the quad of processing elements where the switching elements are again controlled by the main circular buffer. In embodiments, a program counter 1220 is configured to point to the current instruction within a circular buffer. In embodiments with a configured program counter, the contents of the circular buffer are not shifted or copied to new locations on each instruction cycle. Rather, the program counter 1220 is incremented in each cycle to point to a new location in the circular buffer. The circular buffers 1210, 1212, 1214, and 1216 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

The plurality of circular buffers can have differing lengths. That is, the plurality of circular buffers can comprise circular buffers of differing sizes. In embodiments, the circular buffers 1210 and 1212 have a length of 128 instructions, the circular buffer 1214 has a length of 64 instructions, and the circular buffer 1216 has a length of 32 instructions, but other circular buffer lengths are also possible, and in some embodiments, all buffers have the same length. The plurality of circular buffers that have differing lengths can resynchronize with a first pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 12, different circular buffers can have different instruction sets within them. For example, circular buffer 1210 contains a MOV instruction. Circular buffer 1212 contains a SKIP instruction. Circular buffer 1214 contains a SLEEP instruction and an ANDI instruction. Circular buffer 1216 contains an AND instruction, a MOVE instruction, an ANDI instruction, and an ADD instruction. The operations performed by the processing elements 1230, 1232, 1234, and 1236 are dynamic and can change over time, based on the instructions loaded into the respective circular buffers. As the circular buffers rotate, new instructions can be executed by the respective processing element.

Figure 13:
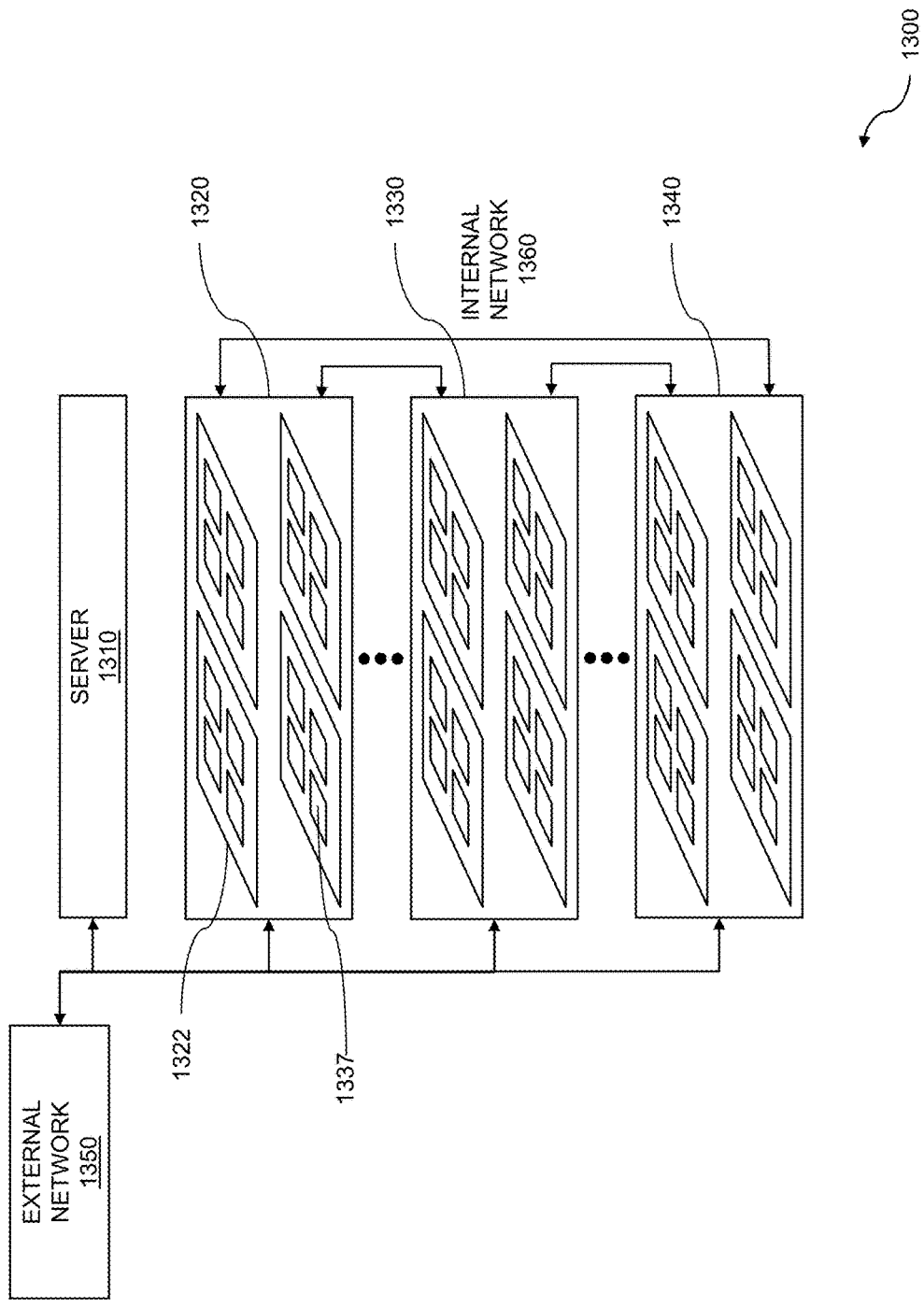
FIG. 13 illustrates solving dataflow graph across multiple chips.

FIG. 13 illustrates solving dataflow graph across multiple chips. In embodiments, system 1300 includes one or more boxes, indicated as 1320, 1330, and 1340. Each box may have one or more boards, indicated generally as 1322. Each board comprises one or more chips, indicated generally as 1337. Each chip may include one or more processing elements, where at least some of the processing elements may execute a process agent. An internal network 1360 allows communication between the boxes, such that processing elements on one box can provide and/or receive results from processing elements on another box.

The server 1310 may be a computer executing programs on one or more processors based on instructions contained in a non-transitory computer readable medium. The server 1310 may perform reconfiguring of a mesh networked computer system comprising a plurality of processing elements with a FIFO between one or more pairs of processing elements. In some embodiments, each pair of processing elements has a dedicated FIFO configured to pass data between the processing elements of the pair. The server 1310 may receive instructions and/or input data from external network 1350. The external network may provide information that includes, but is not limited to, hardware description language instructions (e.g. Verilog, VHDL, or the like), flow graphs, source code, or information in another suitable format.

The server 1310 may collect performance statistics on the operation of the collection of processing elements. The performance statistics can include average sleep time of a processing element, and/or a histogram of the sleep time of each processing element. Any outlier processing elements that sleep more than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 1310 may serve as an allocation and/or configuration manager to process requests for adding or freeing FIFOs, and/or changing the size of existing FIFOs in order to optimize operation of the processing elements.

In some embodiments, the server may receive optimization settings from the external network 1350. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 1310 can perform a reconfiguration based on user-specified parameters via external network 1350.

Figure 14:
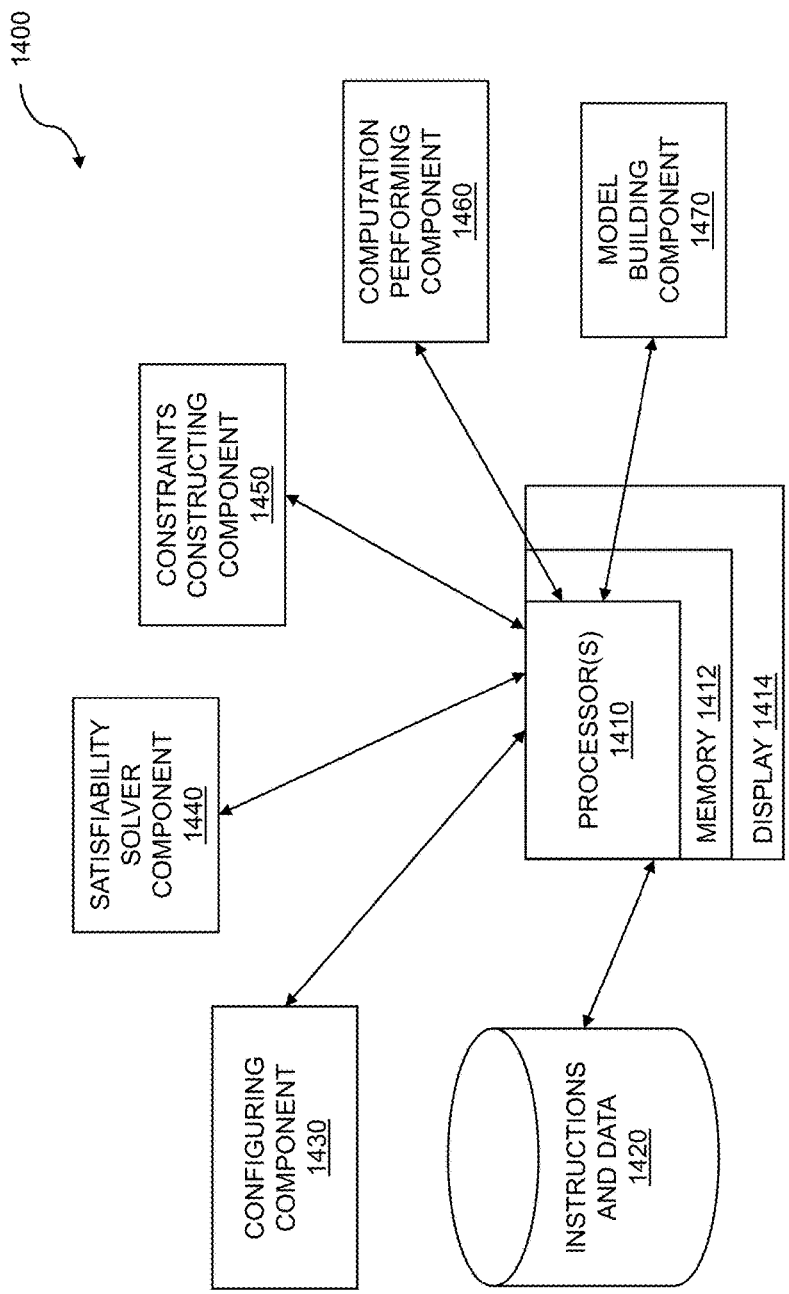
FIG. 14 shows a system for reconfigurable processor fabric implementation using satisfiability analysis.

FIG. 14 shows a system for reconfigurable processor fabric implementation using satisfiability analysis. The system 1400 includes a computer program product embodied in a non-transitory computer readable medium for resource allocation, the computer program product comprising code which causes one or more processors to perform operations. In embodiments, configuring a first plurality of processing elements from a reconfigurable fabric for computational calculations is based on a dataflow graph, wherein the configuring is performed using a satisfiability solver technique comprising constructing a set of mapping constraints, and building a satisfiability model of the mapping constraints. In other embodiments, configuring routing resources within the reconfigurable fabric is based on the satisfiability solver technique. In other embodiments, performing data computation is based on the dataflow graph using the first plurality of processing elements and the routing resources.

The system 1400 can include one or more processors 1410 coupled to a memory 1412 which stores instructions. The system 1400 can include a display 1414 coupled to the one or more processors 1410 for displaying data, intermediate steps, instructions, and so on. Embodiments comprise a computer system for resource allocation comprising: a memory which stores instructions; one or more processors attached to the memory wherein the one or more processors, when executing the instructions which are stored, are configured to: configure a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints; configure routing resources within the reconfigurable fabric based on the satisfiability solver technique; and perform data computation based on the dataflow graph using the first plurality of processing elements and the routing resources.

The system 1400 can include a collection of instructions and data 1420. The instructions and data 1420 may be stored in a database, one or more statically linked libraries, one or more dynamically linked libraries, kernel libraries, precompiled headers, source code, flow graphs, or other suitable formats. System 1400 can include a configuring component 1430. The configuring component 1430 can include functions and instructions for configuring processing, storage, and routing resources in a reconfigurable fabric. The system 1400 can include a satisfiability solver component 1440. The satisfiability solver component 1440 can include functions and instructions for solving Boolean equations representative of routing/processing on a reconfigurable fabric. The system 1400 can include a constraints constructing component 1450. The constraints constructing component 1450 can include functions and instructions for processing various mapping constraints. The constraints may include, but are not limited to, propagation constraints, template constraints, fanout control constraints, cloning constraints, capacity constraints, template incompatibility constraints, special macro constraints, stitching constraints, and/or tiedown constraints. The system 1400 can include a computation performing component 1460. The computation performing component 1460 can include functions and instructions for performing a computation using the reconfigurable fabric. The system 1400 can include a model building component 1470. The model building component 1470 can include functions and instructions for building the SAT-model for the entire or a part of the mapping problem.

The system 1400 can comprise a computer program product embodied in a non-transitory computer readable medium for resource allocation, the computer program product comprising code which causes one or more processors to perform operations of: configuring a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints; configuring routing resources within the reconfigurable fabric based on the satisfiability solver technique; and performing data computation based on the dataflow graph using the first plurality of processing elements and the routing resources.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for resource allocation comprising:
   configuring a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints, and wherein the satisfiability solver technique includes adaptive windowing;
   configuring routing resources within the reconfigurable fabric based on the satisfiability solver technique; and
   performing data computation based on the dataflow graph using the first plurality of processing elements and the routing resources.

2. The method of claim 1 wherein the satisfiability solver technique includes scaling with iterative packing.

3. The method of claim 2 wherein the scaling includes partitioning execution time into overlapping time windows.

4. The method of claim 2 wherein the satisfiability solver technique includes bounding time in an adaptive window to solve an optimization sub-problem.

5. The method of claim 1 wherein the satisfiability solver technique comprises a Boolean satisfiability problem solving technique.

6. The method of claim 5 further comprising solving the satisfiability model.

7. The method of claim 6 further comprising storing a solution of the satisfiability model.

8. The method of claim 7 further comprising trimming the solution, wherein the trimming includes removing unnecessary parts from the solution.

9. The method of claim 1 wherein the satisfiability solver technique further comprises grouping instructions from the dataflow graph.

10. The method of claim 9 wherein the satisfiability solver technique includes solving the instructions which were grouped.

11. The method of claim 10 wherein the solving the instructions which were grouped comprises solving a sub-problem.

12. The method of claim 11 wherein the solving the instructions is across a set of sub-tics within the reconfigurable fabric.

13. The method of claim 1 further comprising scheduling the first plurality of processing elements based on the dataflow graph and the satisfiability solver technique.

14. The method of claim 1 wherein the mapping constraints comprise instructions for implementing a function on a processing element from the first plurality of processing elements.

15. The method of claim 14 wherein the instructions for implementing a function on the processing element are loaded into a circular buffer associated with the processing element that controls the processing element.

16. The method of claim 1 wherein the mapping constraints prevent data collisions within the reconfigurable fabric.

17. The method of claim 1 wherein the mapping constraints comprise a three-dimensional (3D) solution space comprising an x and y physical location of processing elements along with a z dimension time.

18. The method of claim 1 wherein the satisfiability solver technique comprises learning across variables and clauses.

19. The method of claim 1 wherein the satisfiability model includes variables, clauses, and conjunction of clauses.

20. The method of claim 1 wherein the configuring routing resources is based on propagations indicated by routing instructions.

21. The method of claim 1 further comprising partitioning the dataflow graph into time partitions and solving the satisfiability model for a time partition.

22. The method of claim 21 further comprising moving the time partition forward in time and backward in time to optimize the solving the satisfiability model across the backward in time partition, the time partition, and the forward in time partition.

23. The method of claim 21 further comprising applying a template, wherein the template describes local constraints for a node in the time partition of the dataflow graph.

24. The method of claim 1 wherein input data to the dataflow graph is obtained directly from a processing element within the plurality of processing elements.

25. The method of claim 1 wherein input data to the dataflow graph is obtained from outside the reconfigurable fabric.

26. The method of claim 1 wherein output data from the dataflow graph is propagated directly to a processing element within the plurality of processing elements.

27. The method of claim 1 wherein output data from the dataflow graph is propagated outside the reconfigurable fabric.

28. A computer program product embodied in a non-transitory computer readable medium for resource allocation, the computer program product comprising code which causes one or more processors to perform operations of:
configuring a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints, and wherein the satisfiability solver technique includes adaptive windowing;
configuring routing resources within the reconfigurable fabric based on the satisfiability solver technique; and
performing data computation based on the dataflow graph using the first plurality of processing elements and the routing resources.

29. A computer system for resource allocation comprising:
a memory which stores instructions;
one or more processors attached to the memory wherein the one or more processors, when executing the instructions which are stored, are configured to:
configure a first plurality of processing elements from a reconfigurable fabric for computational calculations, based on a dataflow graph, wherein the configuring is performed using a satisfiability solver technique comprising constructing a set of mapping constraints and building a satisfiability model of the mapping constraints, and wherein the satisfiability solver technique includes adaptive windowing;
configure routing resources within the reconfigurable fabric based on the satisfiability solver technique; and
perform data computation based on the dataflow graph using the first plurality of processing elements and the routing resources.

* * * * *